(12) United States Patent
Takita et al.

(10) Patent No.: US 10,855,100 B2
(45) Date of Patent: Dec. 1, 2020

(54) POWER SUPPLY CONTROL APPARATUS AND BATTERY UNIT

(71) Applicant: DENSO CORPORATION, Kariya (JP)

(72) Inventors: Shimpei Takita, Kariya (JP); Yamato Utsunomiya, Kariya (JP); Shunsuke Tomoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 34 days.

(21) Appl. No.: 16/395,726

(22) Filed: Apr. 26, 2019

(65) Prior Publication Data

US 2019/0252908 A1    Aug. 15, 2019

Related U.S. Application Data

(63) Continuation of application No. PCT/JP2017/037068, filed on Oct. 12, 2017.

(30) Foreign Application Priority Data

Nov. 8, 2016  (JP) .................................. 2016-218313

(51) Int. Cl.
*H02J 7/14* (2006.01)
*B60R 16/03* (2006.01)
(Continued)

(52) U.S. Cl.
CPC ............ *H02J 7/1423* (2013.01); *B60R 16/02* (2013.01); *B60R 16/03* (2013.01); *H02H 7/00* (2013.01); *H02J 7/00* (2013.01); *B60R 16/033* (2013.01)

(58) Field of Classification Search
CPC . B60R 16/02; B60R 16/03; H02H 7/00; H02J 7/00
See application file for complete search history.

(56) References Cited

U.S. PATENT DOCUMENTS 6,229,279 B1 * 5/2001 Dierker ................. H02J 7/0013
                                                              320/104
6,600,239 B2 * 7/2003 Winick ................... H02J 1/102
                                                               307/85
(Continued)

FOREIGN PATENT DOCUMENTS

JP  2004-328988 A  11/2004
JP  2013-236297 A  11/2013
JP  2014-030281 A   2/2014

OTHER PUBLICATIONS

Nov. 28, 2017 International Search Report issued in International Patent Application No. PCT/JP2017/037068.

*Primary Examiner* — Daniel Kessie

(74) *Attorney, Agent, or Firm* — Oliff PLC

(57) ABSTRACT

A power supply control apparatus is applied to a power supply system that includes an opening and closing unit that has a plurality of switches that are connected in series on an energization path over which energization from a voltage source is performed and a plurality of diodes that are respectively connected in parallel to the plurality of switches, in which the plurality of diodes include diodes that are arranged in opposite directions to each other. The power supply control apparatus includes a determining unit determining that an abnormal state has occurred in which a current is flowing to any of the plurality of diodes in a state in which the plurality of switches are turned off, and a control unit controlling the switch that is connected in parallel to the diode through which the current is flowing to an on-state, when the abnormal state is determined to have occurred.

14 Claims, 9 Drawing Sheets

(51) Int. Cl.
*H02J 7/00* (2006.01)
*B60R 16/02* (2006.01)
*H02H 7/00* (2006.01)
*B60R 16/033* (2006.01)

(56) References Cited

U.S. PATENT DOCUMENTS

| | | | |
|---|---|---|---|
| 7,800,244 B2* | 9/2010 | Treguer | H02J 7/1423 |
| | | | 307/10.1 |
| 8,791,744 B2* | 7/2014 | Takimoto | H03K 17/0814 |
| | | | 327/427 |
| 9,272,625 B2* | 3/2016 | Sonesson | B60L 1/00 |
| 10,432,184 B1* | 10/2019 | Choi | H03K 17/693 |
| 2006/0097577 A1 | 5/2006 | Kato et al. | |
| 2011/0260544 A1 | 10/2011 | Imai et al. | |
| 2013/0229186 A1* | 9/2013 | Shiraishi | H02J 7/0031 |
| | | | 324/415 |
| 2014/0015534 A1* | 1/2014 | Katayama | H02J 7/007 |
| | | | 324/430 |
| 2015/0340978 A1* | 11/2015 | Seo | B60T 13/662 |
| | | | 318/400.21 |
| 2016/0011266 A1* | 1/2016 | Osanai | G01R 31/42 |
| | | | 324/762.01 |
| 2016/0257270 A1* | 9/2016 | Teramoto | B60R 16/033 |
| 2016/0301202 A1 | 10/2016 | Tsukamoto et al. | |
| 2019/0131804 A1* | 5/2019 | Taniguchi | H02H 7/18 |
| 2020/0094758 A1* | 3/2020 | Kawakami | B60R 16/03 |

* cited by examiner

POWER SUPPLY CONTROL APPARATUS AND BATTERY UNIT

CROSS-REFERENCE TO RELATED APPLICATIONS

The present application is a continuation application of International Application No. PCT/JP2017/037068, filed Oct. 12, 2017, which claims priority to Japanese Patent Application No. 2016-218313, filed Nov. 8, 2016. The contents of these applications are incorporated herein by reference in their entirety.

BACKGROUND

Technical Field

The present disclosure relates to a power supply control apparatus that is applied to a power supply system that is mounted in a vehicle or the like, and performs control related to the power supply system, and a battery unit.

Background Art

Conventionally, regarding a power supply system that includes a storage battery, a power generator, and an electrical load, various types of technology for optimizing control of charging and discharging of the storage battery have been proposed.

For example, in a related art, in a power supply system that includes a power generator, and a first storage battery and a second storage battery that are connected in parallel to an electrical load, a plurality of semiconductor switches are connected in series on an energization path between the power generator, and the first storage battery and the second storage battery, such that parasitic diodes that are respectively present in the semiconductor switches are in opposite directions. In this case, in a state in which all of the semiconductor switches are turned off, energization of the energization path is completely interrupted by the semiconductor switches that are in opposite directions to each other. As a result, unintentional charging and discharging of the second storage battery is prevented.

SUMMARY

The present disclosure provides a power supply control apparatus that is applied to a power supply system that includes an opening and closing unit that has a plurality of switches that are connected in series on an energization path over which energization from a voltage source is performed and a plurality of diodes that are respectively connected in parallel to the plurality of switches, in which the plurality of diodes include diodes that are arranged in opposite directions to each other. The power supply control apparatus determines that an abnormal state has occurred in which a current is flowing to any of the plurality of diodes in a state in which the plurality of switches are turned off. The power supply control apparatus controls the switch that is connected in parallel to the diode through which the current is flowing to an on-state, when the abnormal state is determined to have occurred.

BRIEF DESCRIPTION OF THE DRAWINGS

The present disclosure will be further clarified through the detailed description below, with reference to the accompanying drawings. The drawings are as follows.

DESCRIPTION OF THE EMBODIMENTS

Figure 1:
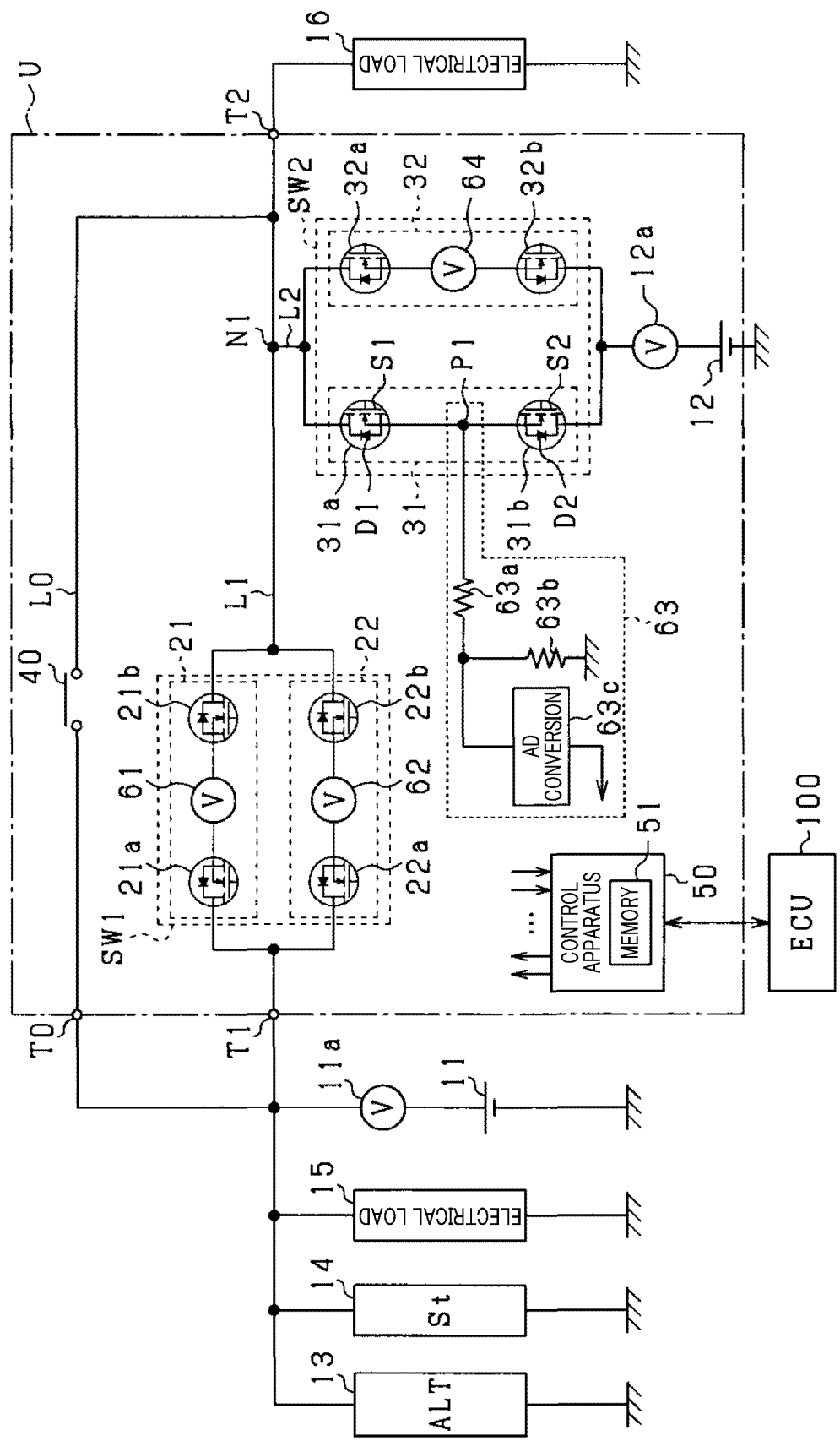
FIG. 1 is an electric circuit diagram of a power supply system according to a first embodiment.

In related art, occurrence of an on-failure can be considered in each of the switches that are provided on the energization path. For example, in the semiconductor switch, an on-failure of the switch may occur as a result of heat from a transient current that is generated during switching of a connection state. In addition, for example, when an on-failure occurs in one of the semiconductor switches that are connected in series such that the parasitic diodes are in opposite directions as in the power supply system in related art, even if off-control is performed for both semiconductor switches, a situation may occur in which a current flows to the parasitic diode of the other semiconductor switch that is normal. In this case, an excessive current may flow to the parasitic diode of the semiconductor switch that is normal. The semiconductor switch that is normal may also fail.

The present disclosure has been achieved in light of the above-described issues. The main object of the present disclosure is to provide a power supply control apparatus that actualizes appropriate control even when an on-failure of a switch occurs, and a battery unit.

According to a first aspect, a power supply control apparatus is applied to a power supply system that includes an opening and closing unit that has a plurality of switches that are connected in series on an energization path over which energization from a voltage source is performed and a plurality of diodes that are respectively connected in parallel to the plurality of switches, in which the plurality of diodes include diodes that are arranged in opposite directions to each other. The power supply control apparatus includes: a determining unit that determines that an abnormal state has occurred in which a current is flowing to any of the plurality of diodes in a state in which the plurality of switches are turned off; and a control unit that controls the switch that is connected in parallel to the diode through which the current is flowing to an on-state, when the abnormal state is determined to have occurred.

In the above-described power supply system, in the opening and closing unit that is provided on an energization path, a plurality of switches are connected in series and diodes are respectively connected in parallel to the plurality of switches. The plurality of diodes include diodes that are arranged in opposite directions to each other. As a result, energization in the opening and closing unit can be completely interrupted in a state in which all of the plurality of switches are turned off (open). However, in the above-described configuration, when an on-failure (close-failure) occurs in any of the plurality of switches, conduction occurring in the opening and closing unit via the switch in which the on-failure has occurred and the diode on the side of the switch other than the switch in which the on-failure has occurred can be considered. That is, a current unintentionally flowing to the diode can be considered. In this case, depending on an allowable current of the diode, damage occurring as a result of a flow of excessive current is a concern.

Regarding this point, an abnormal state in which a current is flowing to any of the plurality of diodes is determined to have occurred in a state in which the plurality of switches are turned off. When the abnormal state is determined to have occurred, the switch that is connected in parallel to the diode through which the current is flowing is controlled to the on-state. As a result, even when the on-failure occurs in any of the plurality of switches in the opening and closing unit, an excessive current flowing to the diode can be suppressed, and adverse issues such as damage can be suppressed.

According to a second aspect, the determining unit determines that the abnormal state in which a current is flowing to any of the plurality of diodes has occurred by determining that an on-failure has occurred in any of the plurality of switches in the opening and closing unit.

In the state in which the plurality of switches in the opening and closing unit are turned off, a current flows to any of the plurality of diodes when the on-failure occurs in any of the plurality of switches. Therefore, the abnormal state in which a current unintentionally flows to a diode can be appropriately determined by whether the on-failure of a switch has been determined to have occurred.

According to a third aspect, the determining unit determines that, when determined that the on-failure has occurred in any of the plurality of switches in the opening and closing unit, a current is flowing to the diode that is in the direction opposite the diode that is connected in parallel to the switch in which the on-failure has occurred, among the plurality of diodes.

As a result of the above-described configuration, the diode to which a current unintentionally flows can be identified based on the switch in which the on-failure has occurred. Therefore, the switch in the opening and closing unit to be turned on can be appropriately ascertained.

According to a fourth aspect, the control unit controls all of the plurality of switches to the on-state when the abnormal state is determined to have occurred.

As a result of the above-described configuration, when a current unintentionally flows to a diode, in addition to the switch that is connected in parallel to the diode through which the current is flowing, the other switches in the opening and closing unit, that is, the other switches including the switch in which the on-failure has occurred are controlled to the on-state. In this case, as a result of the switch in which the on-failure has occurred being controlled to the on-state, on-resistance in the switch is thought to be reduced. Load applied to the switch can be reduced as a result of the reduction in the on-resistance.

According to a fifth aspect, the power supply control apparatus is applied to a power supply system in which a plurality of opening and closing units are provided in parallel on the energization path. The determining unit determines which of the plurality of opening and closing units the abnormal state has occurred in. When the abnormal state is determined to have occurred in any of the plurality of opening and closing units, the control unit controls the plurality of switches in the opening and closing unit in which the abnormal state is not determined to have occurred to the on-state.

As a result of the above-described configuration, when a current unintentionally flows to a diode in any of the plurality of opening and closing units, the switches in each of the plurality of opening and closing units are controlled to the on-state. In this case, even when a current unintentionally flows on a path that includes the opening and closing units, excessive flow of current flowing to the opening and closing unit on the side in which the abnormal state has occurred, among the plurality of opening and closing units, can be suppressed. As a result, in the opening and closing unit on the side in which the abnormal state has occurred, the occurrence of a concurrent failure in switches that are in a normal state can be suppressed According to a sixth aspect, the power supply control apparatus is applied to a power supply system that includes a storage battery that is connected to one end side of the opening and closing unit and a power generator that is connected to the other end side as the voltage source. The determining unit determines that the abnormal state has occurred during a power generation period in which power generation by the power generator is being performed in a state in which the plurality of switches are turned off.

When power generation by the power generator is performed in a state in which the plurality of switches in the opening and closing unit are turned off, energization from the power generator to the storage battery via the opening and closing unit is stopped. In addition, when the on-failure occurs in any of the plurality of switches in this state, the abnormal state in which a current flows to any of the plurality of diodes occurs. That is, during the power generation period of the power generator, a current unintentionally flowing to a diode in the opening and closing unit can be appropriately determined.

According to a seventh aspect, the power supply control apparatus is applied to a power supply system that includes a storage battery that is connected to one end side of the opening and closing unit as the voltage source, in which an electrical load is connected to the other end side of the opening and closing unit. The determining unit determines that the abnormal state has occurred during a discharge period in which discharge from the storage battery to the electrical load is being performed in a state in which the plurality of switches are turned off.

When discharge from the storage battery to the electrical load is performed in a state in which the plurality of switches are turned off, energization from the storage battery to the electrical load via the opening and closing unit is stopped. In addition, when the on-failure occurs in any of the plurality of switches in this state, the abnormal state in which a current flows to any of the plurality of diodes occurs. That is, during the discharge period of the electrical load, a current unintentionally flowing to a diode in the opening and closing unit can be appropriately determined.

According to an eighth aspect, the power supply control apparatus is applied to a power supply system that includes a storage battery that is connected to one end side of the opening and closing unit, and a power generator that is connected to the other end side as the voltage source, in which the power generator performs power generation as a result of rotation of an engine, and the plurality of switches in the opening and closing unit are turned off based on a stop command that stops operation of the engine. The control unit controls the switches to the on-state during a period from the stop command until power generation of the power generator is stopped, when the stop command is issued in a state in which the abnormal state is determined to have occurred.

In the power supply system that includes the power generator that generates electric power with the engine as a power source, and in which the plurality of switches in the opening and closing unit are turned off based on the stop command (such as an off command for a power switch of a vehicle) of the engine, power generation by the power generator may be continued during inertial rotation of the engine even after the switches are turned off by the stop command of the engine. In this case, when the on-failure occurs in a switch, a current unintentionally flowing to a diode can be considered as described above. Regarding this point, as a result of the above-described configuration, when the stop command is issued in a state in which the abnormal state is determined to have occurred, the switches are controlled to the on-state during the period from the stop command until power generation by the power generator is stopped. As a result, even when an abnormality occurs in the power generation state of the power generator immediately after the stop command of the engine, a flow of excessive current to the diode can be appropriately suppressed.

According to a ninth aspect, the power supply control apparatus is applied to a power supply system that includes a storage battery that is connected to one end side of the opening and closing unit as the voltage source, in which an electrical load is connected to the other end side of the opening and closing unit, and the plurality of switches in the opening and closing unit are turned off based on a stop command that stops operation of an engine. The control unit controls the switches to the on-state under a condition that a current period is a period until discharge to the electrical load is stopped or a period until supply of dark current to the electrical load is started, when the stop command is issued in a state in which the abnormal state is determined to have occurred.

In the power supply system in which the plurality of switches in the opening and closing unit are turned off based on the stop command of the engine, driving of the electrical load may be continued even after the switches are turned off by the stop command of the engine. In this case, when the on-failure occurs in a switch, a current unintentionally flowing to a diode can be considered as described above. Regarding this point, as a result of the above-described configuration, when the stop command is issued in a state in which the abnormal state is determined to have occurred, the switches are controlled to the on-state during the period from the stop command until discharge to the electrical load is stopped or the period until the supply of dark current to the electrical load is started. As a result, even when an abnormality occurs in the load driving state immediately after the stop command of the engine, a flow of excessive current to the diode can be appropriately suppressed.

According to a tenth aspect, the power supply control apparatus is applied to a power supply system that includes a first storage battery and a second storage battery that are respectively connected to one end side and the other end side of the opening and closing unit and are connected to each other in parallel as the voltage source, in which the plurality of switches in the opening and closing unit are turned off based on a stop command that stops operation of an engine. The control unit controls the switches to the on-state under a condition that a voltage difference between the first storage battery and the second storage battery is equal to or greater than a predetermined voltage difference, after the stop command is issued in a state in which the abnormal state is determined to have occurred.

In the power supply system in which the plurality of switches in the opening and closing unit are turned off based on the stop command of the engine, after the stop command, when the voltage difference between the first storage battery and the second storage battery is equal to or greater than a predetermined voltage difference, a current is thought to flow between the storage batteries via the opening and closing unit when the on-failure occurs in a switch. Regarding this point, as a result of the above-described configuration, when the stop command is issued in a state in which the abnormal state is determined to have occurred, the switches are controlled to the on-state under a condition that the voltage difference between the first storage battery and the second storage battery is equal to or greater than the predetermined voltage difference after the stop command is issued. As a result, a flow of excessive current to the diode can be appropriately suppressed after the stop command of the engine.

According to an eleventh aspect, the power supply control apparatus is applied to a power supply system that includes a first storage battery and a second storage battery that are connected to each other in parallel as the voltage source, and includes a first opening and closing unit and a second opening and closing unit that are provided in series as the opening and closing unit on an energization path between the first storage battery and the second storage battery, in which an electrical load is connected at an intermediate point between the first opening and closing unit and the second opening and closing unit. The determining unit determines that the abnormal state has occurred in the second opening and closing unit on the second storage battery side during a discharge period in which discharge to the electrical load from only the first storage battery, of the first storage battery and the second storage battery, is being performed. The control unit controls the switches in the second opening and closing unit to the on-state when the abnormal state is determined to have occurred in the second opening and closing unit.

In the power supply system that includes the first storage battery and the second storage battery, and the first opening and closing unit and the second opening and closing unit that are provided in series between the storage batteries, and in which an electrical load is connected at an intermediate point between the first opening and closing unit and the second opening and closing unit, selective discharge to the electrical load can be performed in the storage batteries. In this case, during discharge from one storage battery of the first storage battery and the second storage battery, when the on-failure of a switch occurs in the opening and closing unit on the side of the other storage battery, a current unintentionally flowing to a diode in the opening and closing unit can be considered. Regarding this point, as a result of the above-described configuration, when the abnormal state has occurred in the second opening and closing unit on the second storage battery side during the discharge period in which discharge to the electrical load is performed from only the first storage battery of the first storage battery and the second storage battery, the switches in the second opening and closing unit are controlled to the on-state. As a result of this as well, a flow of excessive current to the diode can be appropriately suppressed.

Here, the above-described eleventh aspect will be described with reference to a configuration in FIG. 1. For example, when a lead storage battery 11 is the first storage battery and a lithium-ion storage battery 12 is the second storage battery, opening and closing units 21 and 22 correspond to the "first opening and closing unit," and opening and closing units 31 and 32 correspond to the "second opening and closing unit." When the abnormal state is determined to have occurred in the opening and closing units 31 and 32 during the discharge period in which discharge to an electrical load 16 is performed from only the lead storage battery 11 of the storage batteries 11 and 12, the control unit controls the switches in the opening and closing units 31 and 32 to the on-state. In addition, when the lithium-ion storage battery 12 is the first storage battery and the lead storage battery 11 is the second storage battery, the opening and closing units 31 and 32 correspond to the "first opening and closing unit," and the opening and closing units 21 and 22 correspond to the "second opening and closing unit." When the abnormal state is determined to have occurred in the opening and closing units 21 and 22 during the discharge period in which discharge to the electrical load 16 is performed from only the lithium-ion storage battery 11 of the storage batteries 11 and 12, the control unit controls the switches in the opening and closing units 21 and 22 to the on-state.

According to a twelfth aspect, the power supply control apparatus is applied to a power supply system that includes a first storage battery and a second storage battery that are connected to each other in parallel as the voltage source, and includes a first opening and closing unit and a second opening and closing unit that are provided in series as the opening and closing unit on an energization path between the first storage battery and the second storage battery, in which a power generator is connected at an intermediate point between the first opening and closing unit and the second opening and closing unit. The determining unit determines that the abnormal state has occurred in the second opening and closing unit on the second storage battery side during a charging period in which charging of only the first storage battery, of the first storage battery and the second storage battery, through power generation by the power generator is being performed. The control unit controls the switches in the second opening and closing unit to the on-state when the abnormal state is determined to have occurred in the second opening and closing unit.

In the power supply system that includes the first storage battery and the second storage battery, and the first opening and closing unit and the second opening and closing unit that are provided in series between the storage batteries, and in which a power generator is connected at an intermediate point between the first opening and closing unit and the second opening and closing unit, supply of generated electric power to at least either of the storage batteries, that is, selective charging in the storage batteries can be performed. In this case, during charging of one storage battery of the first storage battery and the second storage battery, when the on-failure of a switch occurs in the opening and closing unit on the side of the other storage battery, a current unintentionally flowing to a diode in the opening and closing unit can be considered. Regarding this point, as a result of the above-described configuration, when the abnormal state has occurred in the second opening and closing unit on the second storage battery side during the charging period in which charging of only the first storage battery of the first storage battery and the second storage battery through power generation by the power generator is being performed, the switches in the second opening and closing unit are controlled to the on-state. As a result of this as well, a flow of excessive current to the diode can be appropriately suppressed.

Here, the above-described twelfth aspect will be described with reference to a configuration in FIG. 13. For example, when the lead storage battery 11 is the first storage battery and the lithium-ion storage battery 12 is the second storage battery, the opening and closing units 21 and 22 correspond to the "first opening and closing unit," and the opening and closing units 31 and 32 correspond to the "second opening and closing unit." When the abnormal state is determined to have occurred in the opening and closing units 31 and 32 during the charging period in which charging of only the lead storage battery 11 of the storage batteries 11 and 12 through power generation by an integrated starter generator (ISG) 17 is being performed, the control unit controls the switches in the opening and closing units 31 and 32 to the on-state. In addition, when the lithium-ion storage battery 12 is the first storage battery and the lead storage battery 11 is the second storage battery, the opening and closing units 31 and 32 correspond to the "first opening and closing unit," and the opening and closing units 21 and 22 correspond to the "second opening and closing unit." When the abnormal state is determined to have occurred in the opening and closing units 21 and 22 during the charging period in which charging of only the lithium-ion storage battery 12 of the storage batteries 11 and 12 through power generation the ISG 17 is being performed, the control unit controls the switches in the opening and closing units 21 and 22 to the on-state.

According to a thirteenth aspect, the power supply control apparatus is applied to a power supply system that includes a storage battery that is capable of performing discharge over the energization path as the voltage source. The power supply control apparatus includes a storage unit that, when the abnormal state is determined to have occurred, stores abnormality history thereof in a memory. When the storage battery is replaced in a state in which the abnormal state is determined to have occurred, after replacement thereof, the control unit controls the switch that is connected in parallel to the diode through which the current is flowing to the on-state, based on the abnormality history that is stored in the memory.

Replacement of the storage battery being performed in a state in which the on-failure has occurred in a switch in the opening and closing unit can also be considered. In this case, for example, an excessive current unintentionally flowing to the diode immediately after the storage battery is replaced with a new battery is a concern. Regarding this point, as a result of the above-described configuration, after replacement of the storage battery, the switches are controlled to the on-state based on the abnormality history stored in the memory. As a result, a flow of excessive current to the diode can be appropriately suppressed even immediately after replacement of the storage battery.

A battery unit may be that which includes the configuration below. That is, according to a fourteenth aspect, a battery unit is applied to a power supply system that includes a first storage battery and a second storage battery as a voltage source. The battery unit includes: a first output terminal to which the first storage battery is connected; a second output terminal to which at least either of an electrical load that is driven by electric power supply from the voltage source and a power generator is connected; the second storage battery; a first opening and closing unit that is provided on a first electrical path that connects the first output terminal and the second output terminal, and opens or closes the first electrical path; a second opening and closing unit that is provided on a second electrical path that connects a connection point on a side further towards the second output terminal than the first opening and closing unit on the first electrical path and the second storage battery, and opens or closes the second electrical path; and a control apparatus that controls opening and closing of the first opening and closing unit and the second opening and closing unit. The first opening and closing unit and the second opening and closing unit have a plurality of switches that are connected in series and a plurality of diodes that are respectively connected in parallel to the plurality of switches. The plurality of diodes include diodes that are arranged in opposite directions to each other. The control apparatus includes a determining unit that determines that an abnormal state has occurred in which a current is flowing to any of the plurality of diodes in a state in which the plurality of switches are turned off, and a control unit that controls the switch that is connected in parallel to the diode through which the current is flowing to an on-state, when the abnormal state is determined to have occurred.

First Embodiment

An embodiment actualizing the present disclosure will hereinafter be described with reference to the drawings. According to the present embodiment, an in-vehicle power supply system that supplies electric power to various apparatuses of a vehicle, in a vehicle that travels with an engine (internal combustion engine) serving as a drive source, is actualized.

As shown in FIG. 1, the present power supply system is a dual power supply system that includes a lead storage battery 11 and a lithium-ion storage battery 12 as a first storage battery and a second storage battery. Each of the storage batteries 11 and 12 can be charged by an alternator 13 that serves as a power generator. In addition, power supply to a starter 14 and various types of electrical loads 15 and 16 can be performed from the storage batteries 11 and 12. In the present system, the lead storage battery 11 and the lithium-ion storage battery 12 are connected in parallel to the alternator 13. In addition, the lead storage battery 11 and the lithium-ion storage battery 12 are connected in parallel to the electrical loads 15 and 16. According to the present embodiment, the storage batteries 11 and 12, and the alternator 13 correspond to a "voltage source."

The lead storage battery 11 is a known general-purpose storage battery. In contrast, the lithium-ion storage battery 12 is a high-density storage battery that has low power loss during charging and discharging, and high output density and energy density. The lithium-ion storage battery 12 is preferably a storage battery that has higher energy efficiency during charging and discharging than the lead storage battery 11. In addition, the lithium-ion storage battery 12 is configured as an assembled battery configured to include a plurality of unit batteries. Rated voltages of the storage batteries 11 and 12 are the same and are, for example, 12 volts.

Although a detailed description with reference to the drawings will be omitted, the lithium-ion storage battery 12 is configured as a substrate-integrated battery unit U that is housed in a housing case. The battery unit U has output terminals T1, T2, and TO. The lead storage battery 11, the alternator 13, the starter 14, and the electrical load 15 are connected to the output terminals T1 and TO, among the output terminals T1, T2, and TO. The electrical load 16 is connected to the output terminal T2.

A rotation shaft of the alternator 13 is drivably connected to an engine output shaft (not shown) by a belt or the like. The rotation shaft of the alternator 13 rotates as a result of rotation of the engine output shaft. That is, the alternator 13 performs power generation (regenerative power generation) as a result of the rotation of the engine output shaft and an axle.

The electrical loads 15 and 16 have differing requirements regarding the voltage of the supplied electric power supplied from the storage batteries 11 and 12. Of the electrical loads 15 and 16, the electrical load 16 includes a constant voltage-requiring load that requires the voltage of the supplied electric power to be stable, so as to be fixed or to at least vary within a predetermined range. In contrast, the electrical load 15 is a common electrical load other than the constant voltage-requiring load. The electrical load 16 can also be considered to be a protected load. In addition, the electrical load 16 is a load regarding which power supply failure is not permitted. The electrical load 15 can also be considered to be a load regarding which power supply failure is permitted, compared to the electrical load 16.

As specific examples of the electrical load 16 that is the constant voltage-requiring load, a navigation apparatus, an audio apparatus, a meter apparatus, and various types of electronic control units (ECUs) such as an engine ECU can be given. In this case, as a result of voltage variations in the supplied electric power being suppressed, occurrence of unnecessary resets and the like can be suppressed in the above-described apparatuses, and stable operation can be actualized. Traveling system actuators, such as an electric steering apparatus and a brake apparatus, may also be included as the electrical load 16. In addition, as specific examples of the electrical load 15, a seat heater, a heater for a rear window defroster, headlights, a front windshield wiper, a blower fan of an air-conditioning apparatus, and the like can be given.

Next, an electrical configuration of the battery unit U will be described. As shown in FIG. 1, the battery unit U is provided with an energization path L1 and an energization path L2 as in-unit electrical paths. The energization path L1 connects the output terminals T1 and T2, and the energization path L2 connects a connection point N1 on the energization path L1 and the lithium-ion storage battery 12. A first switch group SW1 is provided on the energization path L1, of the energization paths L1 and L2, and a second switch group SW2 is provided on the energization path L2. Here, in terms of the electrical path connecting the lead storage battery 11 and the lithium-ion storage battery 12, the first switch group SW1 is provided further towards the lead storage battery 11 side than the connection point N1, and the second switch group SW2 is provided further towards the lithium-ion storage battery 12 than the connection point N1.

The switch groups SW1 and SW2 each include two opening and closing units 21 and 22, and 31 and 32. The two opening and closing units in each switch group are connected to each other in parallel. Furthermore, the opening and closing units 21, 22, 31 and 32 each include two metal-oxide semiconductor field-effect transistors (MOSFETs) (semiconductor switches). The two MOSFETs are connected in parallel such that parasitic diodes of the two MOSFETs that form a pair are in opposite directions to each other.

For example, when the opening and closing unit 31 is described in detail, the opening and closing unit 31 is configured by semiconductor switches 31a and 31b being connected in series. The semiconductor switches 31a and 31b have a rectifying means in an internal configuration thereof. That is, an internal circuit of the semiconductor switch 31a is a circuit in which a switch unit S1 and a parasitic diode D1 are connected in parallel. In a similar manner, the semiconductor switch 31b is also a circuit in which a switch unit S2 and a parasitic diode D2 are connected in parallel. In addition, the semiconductor switches 31a and 31b are connected in series such that the parasitic diodes D1 and D2 are in opposite directions to each other. For convenience, the description is given using the opening and closing unit 31. However, the other opening and closing units 21, 22, and 32 are also configured in a manner similar to the opening and closing unit 31. Here, in FIG. 1, the parasitic diodes D1 and D2 are connected to each other by respective anodes. However, respective cathodes of the parasitic diodes D1 and D2 may be connected to each other.

As described above, as a result of the switch groups SW1 and SW2 being configured, for example, when the second switch group SW2 is in an off-state, that is, when the semiconductor switches 31a, 31b, 32a, and 32b are in the off-state, a flow of current through the parasitic diodes is completely interrupted. That is, unintentional discharging from the lithium-ion storage battery 12 to the lead storage battery 11 side and unintentional charging from the lead storage battery 11 side to the lithium-ion storage battery 12 can be prevented.

Here, instead of the MOSFET, an insulated-gate bipolar transistor (IGBT), a bipolar transistor, or the like can be used as the semiconductor switch. When the IGBT or the bipolar transistor is used, a diode is connected in parallel to each switch unit instead of the above-described parasitic diode.

In addition, a bypass path L0 that bypasses the first switch group SW1 is provided in the battery unit U. The bypass path L0 is provided in parallel with the energization path L1 so as to connect the output terminal TO and the connection point N1 on the energization path L1. That is, as a result of the bypass path L0, the lead storage battery 11 and the electrical load 16 can be connected without passing through the first switch group SW1. A bypass switch 40 that is composed of a normally closed mechanical relay is provided on the bypass path L0. As a result of the bypass switch 40 being set to a closed state, the lead storage battery 11 and the electrical load 16 are electrically connected even when the first switch group SW1 is turned off (open). For example, in a state in which a power switch (ignition switch) of the vehicle is turned off, a dark current is supplied to the electrical load 16 via the bypass switch 40. Here, the bypass path L0 and the bypass switch 40 can be provided outside the battery unit U.

The battery unit U includes a control apparatus 50 that controls on/off (opening/closing) of the switch groups SW1 and SW2, and the bypass switch 40. The control apparatus 50 is configured by a microcomputer that includes a central processing unit (CPU), a read-only memory (ROM), a random access memory (RAM), an input/output interface, and the like. The control unit 50 has a backup memory 51 that is capable of storing storage content therein even after power supply is interrupted. In addition, an ECU 100 that is outside the battery unit U is connected to the control apparatus 50. That is, the control apparatus 50 and the ECU 100 are connected by a communication network, such as a controller area network (CAN), and capable of communicating with each other. Various types of data stored in the control apparatus 50 and the ECU 100 can be shared therebetween.

The control apparatus 50 controls on/off of the switch groups SW1 and SW2, and the bypass switch 40 based on charging states of the storage batteries 11 and 12, and command values from the ECU 100 that is a high-order control apparatus. As a result, charging and discharging are performed through selective use of the lead storage battery 11 and the lithium-ion storage battery 12. In FIG. 1, a voltage sensor 11a that detects a battery voltage Vb of the lead storage battery 11 is connected to the energization path of the lead storage battery 11 and a voltage sensor 12a that detects a battery voltage Vb of the lithium-ion storage battery 12 is connected to the energization path of the lithium-ion storage battery 12. For example, the control apparatus 50 calculates a state of charge (SOC; remaining capacity) of the lithium-ion storage battery 12 and controls a charging amount and a discharge amount of the lithium-ion storage battery 12 such that the SOC is maintained within a predetermined usage range.

In the present power supply system configured as described above, electric power can be supplied to the electrical loads 15 and 16 from at least either of the lead storage battery 11 and the lithium-ion storage battery 12. In addition, when the alternator 13 is generating electric power, the generated electric power can be supplied to the lead storage battery 11, the lithium-ion storage battery 12, and the electrical loads 15 and 16.

Figure 2:
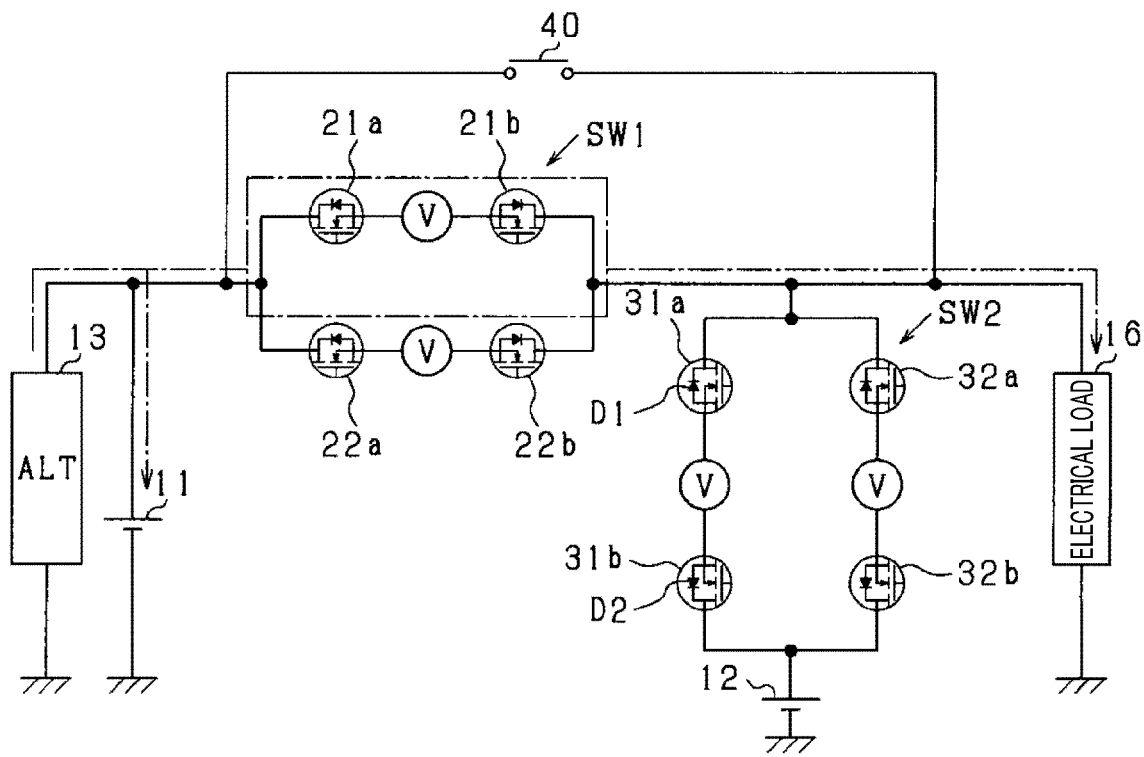
FIG. 2 is a diagram of an energization state during a power generation period by a power generator.

Here, an energization state during a power generation period in which the alternator 13 performs power generation while the engine is operating will be described with reference to FIG. 2. In FIG. 2, the first switch group SW 1 is in an on-state as a result of an on-command being issued to the first switch group SW1 by the control apparatus 50, and the second switch group SW2 is in an off-state as a result of an off-command being issued to the second switch group SW2. As a result, as indicated by arrows in FIG. 2, charging from the alternator 13 to the lead storage battery 11 is performed and discharging to the electrical load 16 via the energization path L1 is performed. In addition, when the first switch group SW1 is in the on-state and the second switch group SW2 is in the off-state, regardless of whether power generation by the alternator 13 is performed, supply of electric power to the electrical load 16 from the lead storage battery 11 is appropriately performed. Because the engine is in operation, the bypass switch 40 is in the off-state.

Figure 3:
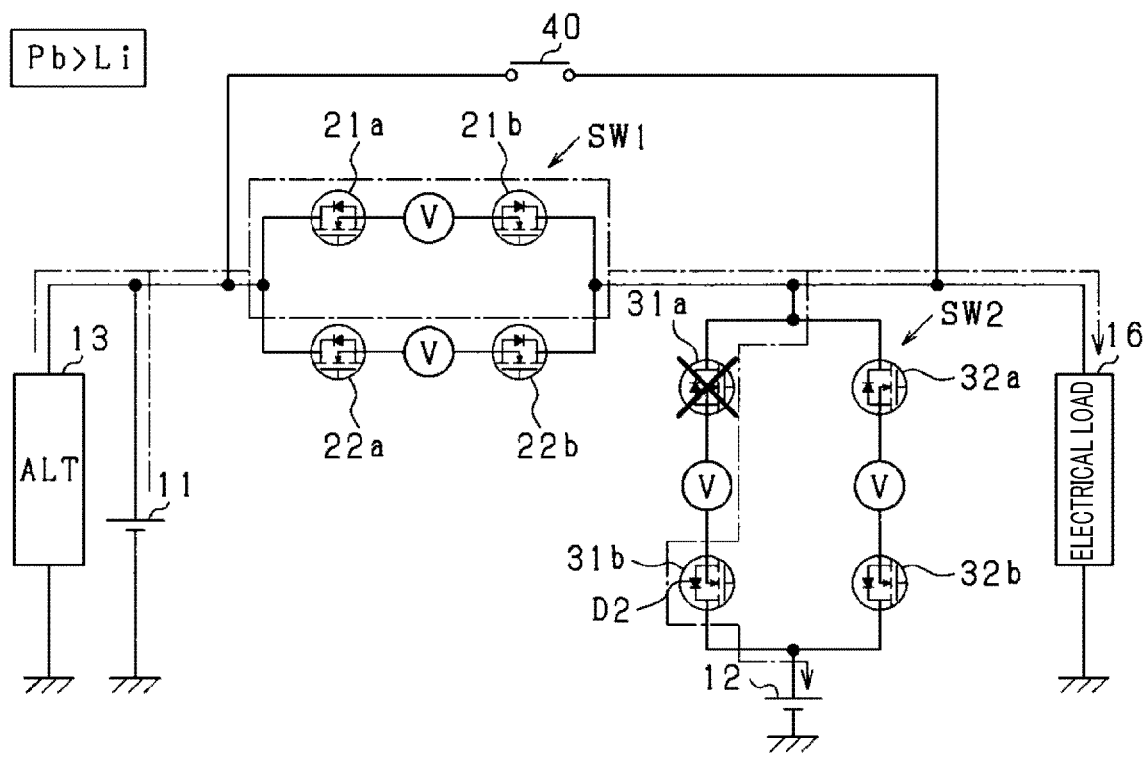
FIG. 3 is a diagram of an energization state when an on-failure occurs in a semiconductor switch.
Figure 4:
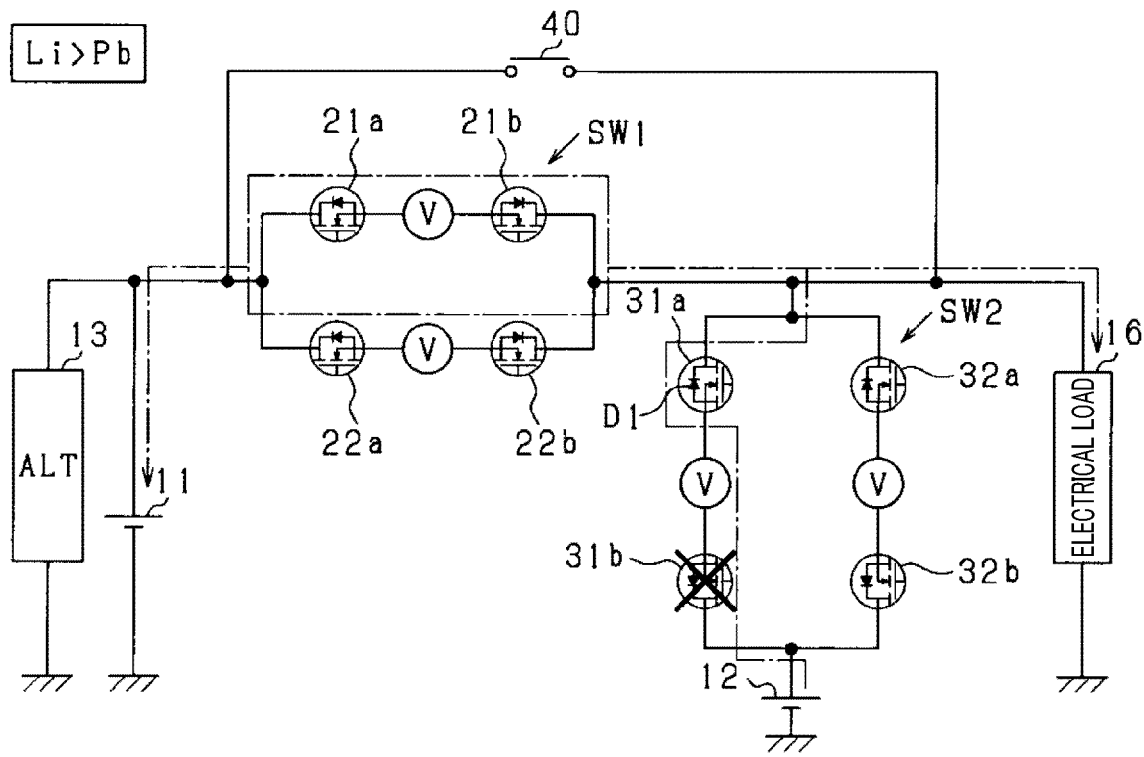
FIG. 4 is a diagram of an energization state when an on-failure occurs in a semiconductor switch.

During the power generation period and discharge period such as this, an on-failure may occur in any of the semiconductor switches among the semiconductor switches 31a, 31b, 32a, and 32b in the second switch group SW2 that is in the off-state. The on-failure refers to a state in which the switch is fixed at on as a result of heat from a transient current that is generated during switching of the connection state or the like. Here, for example, when the on-failure occurs in either of the semiconductor switches 31a and 31b in the opening and closing unit 31 of the second switch group SW2, a state in which a current unintentionally flows occurs depending on a difference in voltage between the lead storage battery 11 and the lithium-ion storage battery 12. FIG. 3 shows a case in which a current unintentionally flows to the opening and closing unit 31 in accompaniment with an on-failure in the semiconductor switch 31a. FIG. 4 shows a case in which a current unintentionally flows to the opening and closing unit 31 in accompaniment with an on-failure in the semiconductor switch 31b.

When a terminal voltage of the lead storage battery 11 is greater than a terminal voltage of the lithium-ion storage battery 12 during the on-failure of the semiconductor switch 31a shown in FIG. 3, a current flows to the lithium-ion storage battery 12 from the lead storage battery 11 or the alternator 13 via the opening and closing unit 31. That is, the current flows to the lithium-ion storage battery 12 as a result of the semiconductor switch 31a conducting the current as a result of the on-failure and, furthermore, the parasitic diode D2 of the semiconductor switch 31b conducting the current. In addition, in this case, an unintentional current flows to the parasitic diode D2, and depending on the magnitude of the allowable current of the parasitic diode D2, damage may occur.

Meanwhile, when the terminal voltage of the lithium-ion storage battery 12 is greater than the terminal voltage of the lead storage battery 11 during the on-failure in the semiconductor switch 31b, a current flows from the lithium-ion storage battery 12 via the opening and closing unit 21. That is, the current flows to the lead storage battery 11 and the electrical load 16 as a result of the semiconductor switch 31b conducting the current as a result of the on-failure and, furthermore, the parasitic diode D1 of the semiconductor switch 31a conducting the current. In addition, in this case, an unintentional current flows to the parasitic diode D1, and depending on the magnitude of the allowable current of the parasitic diode D1, damage may occur.

Therefore, the control apparatus 50 that controls the power supply system according to the present embodiment determines whether an abnormal state has occurred, the abnormal state being a state in which, in a state in which either of the switch groups SW1 and SW2 is turned off, a current flows to any of the diodes in the switch group SW1 or SW2 that is in the off-state. When determined that the abnormal state has occurred, the control apparatus 50 outputs the on-command to the switch group SW1 or SW2 and controls the semiconductor switches to be in the on-state. Determination of the above-described abnormal state is performed by a determination being made that the on-failure has occurred in any of the plurality of semiconductor switches included in the switch groups SW1 and SW2. That is, the abnormal state herein refers to a state in which, in a state in which either of the switch groups SW1 and SW2 is turned off, as a result of the on-failure occurring in any of the semiconductor switches in the switch group that is in the off-state, a current may flow to the diode of the other semiconductor switch or a current is actually flowing to the diode of the other semiconductor switch.

In other words, according to the present embodiment, when the on-failure in one semiconductor switch is detected in the opening and closing units of the semiconductor switches that are provided such that the parasitic diodes are in opposite directions, control is performed such that the other semiconductor switches are in the on-state. As a result, an unintentional current can be prevented from flowing to the parasitic diode of the other semiconductor switches.

Determination of the on-failure in a switch will be described below. As shown in FIG. 1, at an intermediate point P1 between the semiconductor switches 31a and 31b, a voltage detection circuit 63 that monitors a voltage at the intermediate point is provided. That is, the voltage detection circuit 63 is provided as a means for determining the on-failure between the semiconductor switches of which the directions of the parasitic diodes D1 and D2 are opposite each other. According to the present embodiment, detection of a voltage value at the intermediate point P1 is performed by the voltage detection circuit 63 under an assumption that the voltage value at the intermediate point P1 changes based on the on-failure in the semiconductor switch 31a or 31b.

The voltage detection circuit 63 is configured by a voltage division circuit that includes a pair of resistors 63a and 63b. One end side of the voltage division circuit (resistor series circuit) is connected to the intermediate point P1, and the other end side is grounded. In addition, the voltage between the resistors 63a and 63b is inputted to an analog-to-digital (A/D) converting unit 63c as a voltage detection signal and outputted to the control apparatus 50. Here, a voltage detection circuit 61 is provided between the semiconductor switches 21a and 21b. A voltage detection circuit 62 is provided between the semiconductor switches 22a and 22b. A voltage detection circuit 64 is provided between the semiconductor switches 32a and 32b. Although omitted in the drawing, the voltage detection circuits 61, 62, and 64 are also configured in a manner similar to the voltage detection circuit 63.

Here, for example, when the semiconductor switches 31a and 31b are both in the on-state, the voltage at the intermediate point P1 is equal to or greater than a predetermined value. Whether the voltage is in this state is monitored by the voltage detection circuit 63. Meanwhile, when the semiconductor switches 31a and 31b are both in the off-state, the voltage at the intermediate point P1 is less than the predetermined value. Whether the voltage is in this state is monitored by the voltage detection circuit 63.

The control apparatus 50 determines the on-failure in the semiconductor switches in the second switch group SW2 based on the voltage detection results of the voltage detection circuits 63 and 64. For example, when the off-command is issued for the second switch group SW, when at least any of the semiconductor switches is in the on-state (when the on-failure has occurred), the detected voltage of the voltage detection circuit 63 or 64 becomes an abnormal value (equal to or greater than the predetermined value). Based on this phenomenon, the control apparatus 50 determines that the on-failure has occurred in any of the semiconductor switches in the second switch group SW2.

Then, when the on-failure is determined to have occurred in any of the semiconductor switches in the switch groups SW1 and SW2, the control apparatus 50 controls at least the semiconductor switches in which the on-failure has not occurred, in the switch group that includes the semiconductor switch in which the on-failure has occurred, to be in the on-state. According to the present embodiment, all of the plurality of semiconductor switches in the switch group that includes the semiconductor switch in which the on-failure has occurred are controlled to be in the on-state.

For example, when the on-failure occurs in the semiconductor switch 31a, the control apparatus 50 controls the second switch group SW2 to be in the on-state. As a result, a current flows from the lead storage battery 11 or the alternator 13 to the lithium-ion storage battery 12 via the second switch group SW2, that is, each switch unit of the opening and closing unit 31 and the opening closing unit 32. As a result, a current can be prevented from flowing to the parasitic diode D2 of the semiconductor switch 31b. Here, the alternator 13 and the lithium-ion storage battery 12 are in a connected state as a result of the second switch group SW2 being in the on-state. A power generation voltage of the alternator 13 may be restricted such that the lithium-ion storage battery 12 does not become overcharged.

In addition, when the on-failure occurs in the semiconductor switch 31b, the control apparatus 50 controls the second switch group SW2 to the on-state. As a result, a current flows from the lithium-ion storage battery 12 to the lead storage battery 11 and the electrical load 16 via the second switch group SW2. As a result, a current can be prevented from flowing to the parasitic diode D1 of the semiconductor switch 31*a*.

Figure 5:
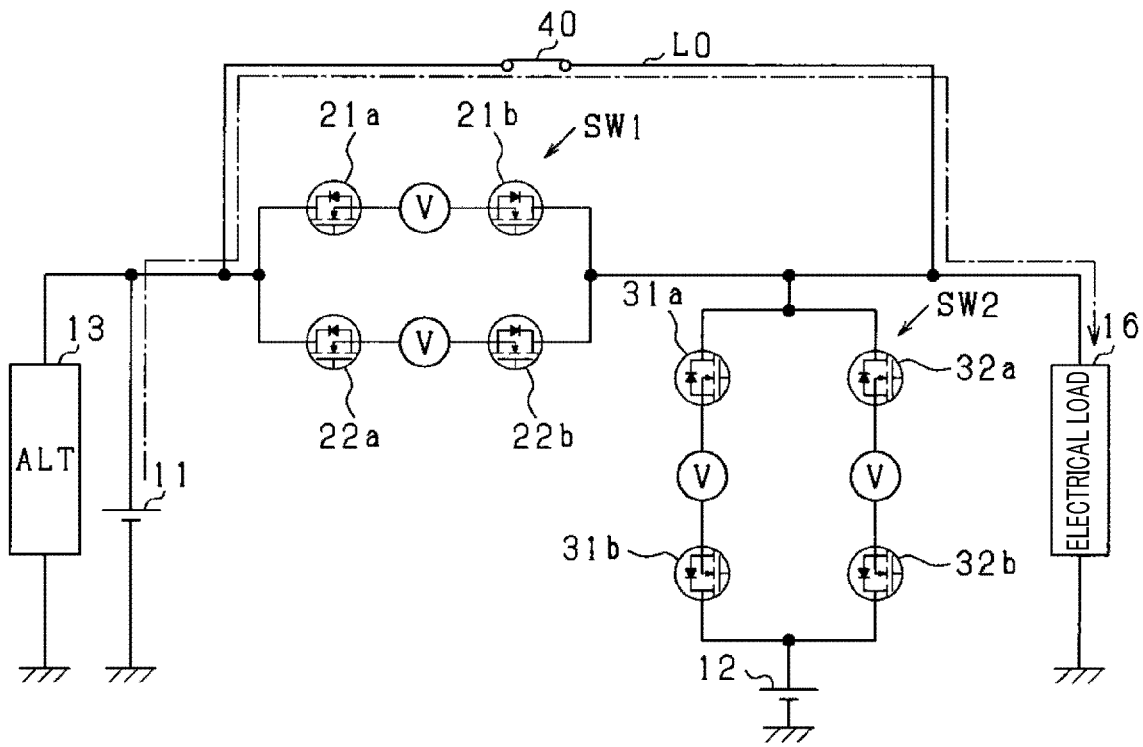
FIG. 5 is a diagram of discharge from a lead storage battery to an electrical load via a bypass path.

Here, in the on/off control of the switch groups SW1 and SW2, when the ignition switch is turned off, that is, when an engine stop command is issued, the first switch group SW1 and the second switch group SW2 transition to the off-state in accompaniment with the operation of the control apparatus 50 being stopped. At this time, the first switch group SW1 and the second switch group SW2 enter the off-state. Instead, the bypass switch 40 enters a closed state. The energization state in this case is shown in FIG. 5. In this manner, in the state in which the ignition switch is turned off (while the engine is stopped), electric power is supplied from the lead storage battery 11 to the electrical load 16 via the bypass path L0.

Figure 6:
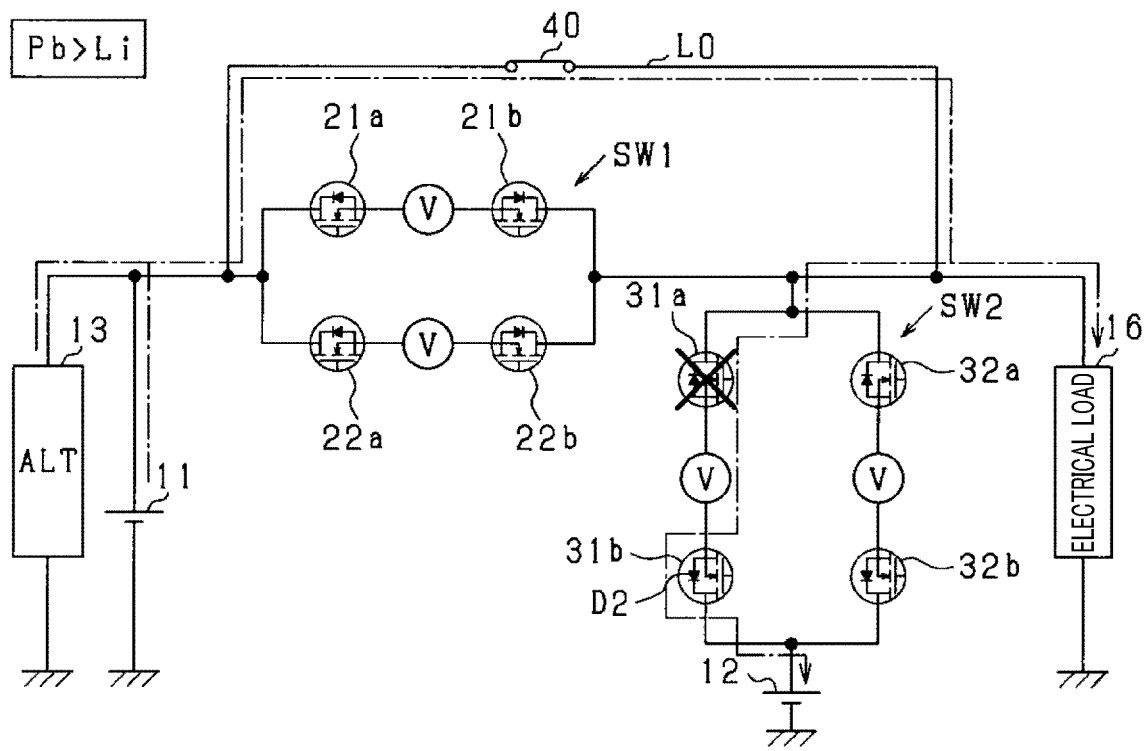
FIG. 6 is a diagram of an energization state when an on-failure occurs in a semiconductor switch.
Figure 7:
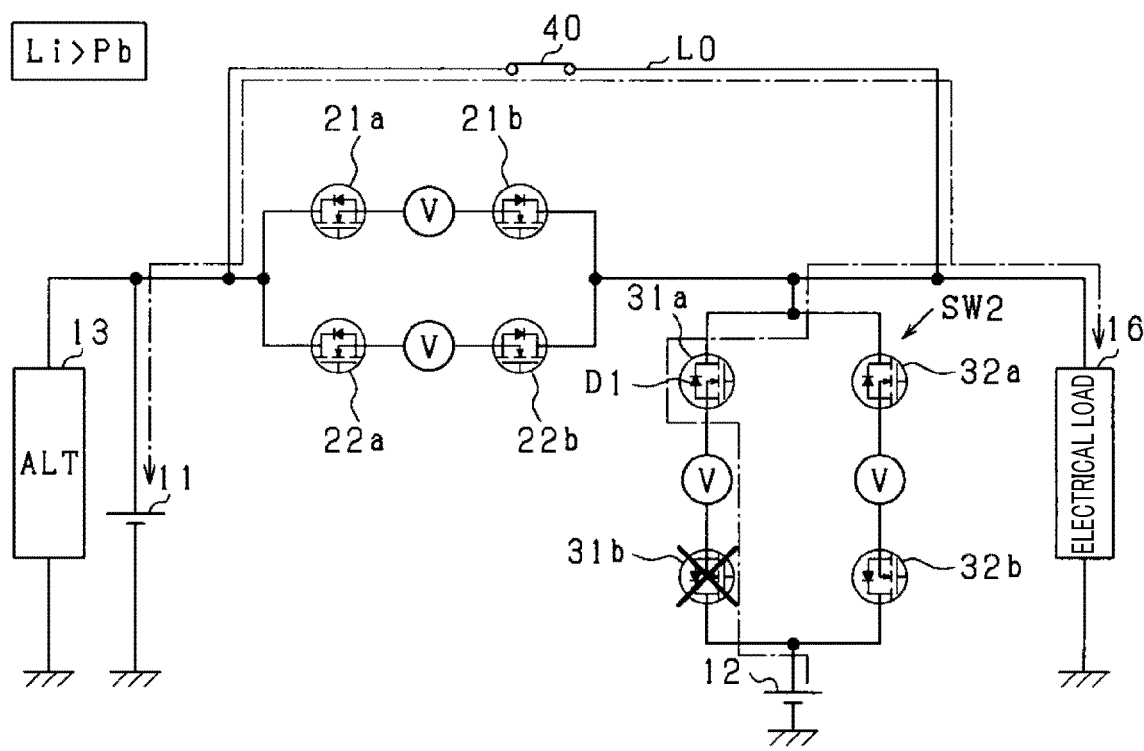
FIG. 7 is a diagram of an energization state when an on-failure occurs in a semiconductor switch.

Meanwhile, in some cases, power generation by the alternator 13 is continued or driving of the electrical load 16 is continued immediately after the ignition switch is turned off. When the on-failure occurs in a switch in such cases, a current unintentionally flows to the opening and closing unit as described above. Regarding power generation by the alternator 13, when an engine rotation speed after the ignition is turned off is equal to or greater than a predetermined rotation speed, power generation is continued. FIG. 6 shows a case in which a current unintentionally flows to the opening and closing unit 31 immediately after the ignition switch is turned off, in a situation in which the on-failure has occurred in the semiconductor switch 31*a*. FIG. 7 shows a case in which a current unintentionally flows to the opening and closing unit 31 immediately after the ignition switch is turned off, in a situation in which the on-failure has occurred in the semiconductor switch 31*b*.

In FIG. 6, when power generation by the alternator 13 is continued immediately after the ignition is turned off, the generated current flows from the alternator 13 to the lithium-ion storage battery 12 via the opening and closing unit 31, by way of the bypass path L0. That is, in this case, an unintentional current flows to the parasitic diode D2. Meanwhile, when the terminal voltage of the lead storage battery 11 is greater than the terminal voltage of the lithium-ion storage battery 12, the current flows to the lithium-ion storage battery 12 via the opening and closing unit 31. In this case as well, an unintentional current flows to the parasitic diode D2.

In FIG. 7, when driving of the electrical load 16 is continued immediately after the ignition is turned off, the current flows from the lithium-ion storage battery 12 to the electrical load 16 via the opening and closing unit 31. That is, in this case, an unintentional current flows to the parasitic diode D1. Meanwhile, when the terminal voltage of the lithium-ion storage battery 12 is greater than the terminal voltage of the lead storage battery 11, a current flows from the lithium-ion storage battery 12 via the opening and closing unit 31. In this case as well, an unintentional current flows to the parasitic diode D1.

Therefore, according to the present embodiment, when a stop command that accompanies the turning off of the ignition switch is issued in a situation in which the on-failure in the semiconductor switch is determined, the semiconductor switches are set to the on-state during a predetermined period from the stop command. In other words, when the state is such that an excessive current may flow to the parasitic diode, the on-control of the switches is performed even immediately after the ignition switch is turned off.

Here, the predetermined period refers to at least any period among a period from the stop command until power generation by the alternator 13 is stopped, a period from the stop command until discharge of the electrical load 16 is stopped, a period from the stop command until the supply of dark current to the electrical load 16 is started, and a period until the voltage difference between the lead storage battery 11 and the lithium-ion storage battery 12 becomes less than a predetermined value after the stop command. According to the present embodiment, the on-control of the switches is performed when any period among the above-described periods occurs.

Figure 8:
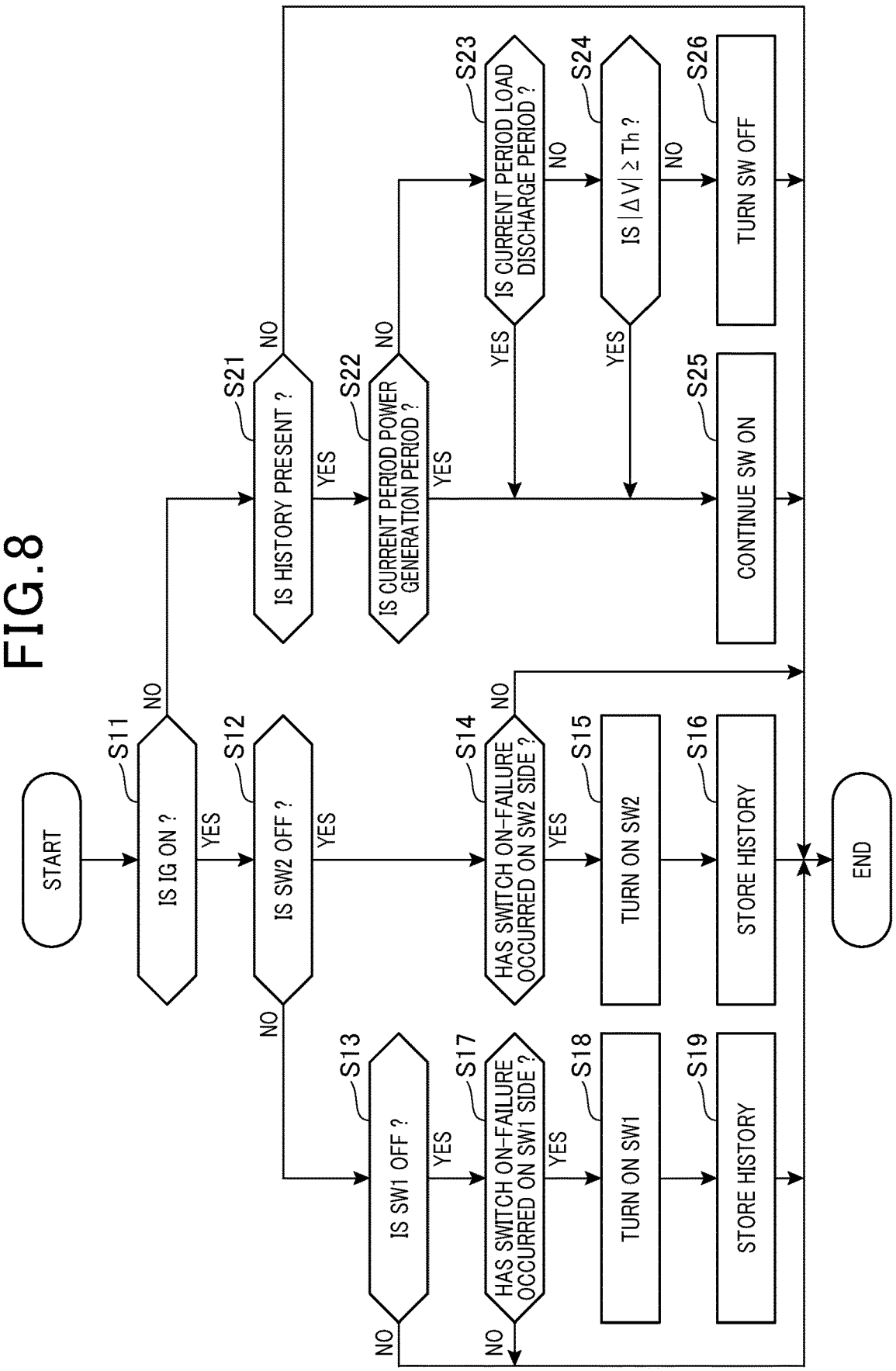
FIG. 8 is a flowchart of a process according to the first embodiment.

Next, a process performed by the control apparatus 50 according to the present embodiment will be described with reference to a flowchart in FIG. 8. The process is repeatedly performed at a predetermined control cycle. The control apparatus 50 performs the process in FIG. 8 when the ignition switch is turned on and during a predetermined period after the ignition switch is turned off.

First, at step S11, the control apparatus 50 determines whether the ignition switch is turned on. When determined YES at step S11, the control apparatus 50 proceeds to step S12. When determined NO at step S11, the control apparatus 50 proceeds to step S21.

At step S12, the control apparatus 50 determines whether the second switch group SW2 is in the off-state as a result of the off-command. At step S13, the control apparatus 50 determines whether the first switch group SW1 is in the off-state as a result of the off-command. Here, in the present power supply system, when the ignition switch is turned on, as a rule, the switch groups SW1 and SW2 are not both set to the off-state. At least either of the switch groups SW and SW2 is set to the on-state. Therefore, the control apparatus 50 determining YES at step S12 means that the second switch group SW2 is in the off-state and the first switch group SW1 is in the on-state. The control apparatus 50 determining YES at step S13 means that the second switch group SW2 is in the on-state and the first switch group SW1 is in the off-state. Here, when both switch groups SW1 and SW2 are in the on-state, the control apparatus 50 determines NO at both steps S12 and S13, and temporarily ends the present process.

Therefore, a period during which step S12 is affirmative can, in other words, be referred to as the power generation period in which power generation by the alternator 13 is being performed in a state in which the semiconductor switches of the second switch group SW2 are turned off, and can further be referred to as the discharge period in which discharge to the electrical load 16 is being performed. Meanwhile, a period during which step S13 is affirmative can be referred to as the discharge period in which discharge from the lithium-ion storage battery 12 to the electrical load 16 is being performed in a state in which the semiconductor switches of the first switch group SW1 are turned off, and can further be referred to as the power generation period in which power generation by the alternator 13 is being performed.

At step S14, the control apparatus 50 determines whether the on-failure has occurred in any of the semiconductor switches in the second switch group SW2. Specifically, the control apparatus 50 determines whether the voltage values detected by the voltage detection circuits 63 and 64 are equal to or greater than a predetermined value Vth. When determined NO at step S14, the control apparatus 50 immediately ends the present process. Meanwhile, when determined YES at step S14, the control apparatus 50 determines that the on-failure has occurred in a semiconductor switch in the second switch group SW2 and proceeds to step S15. At step S15, the control apparatus 50 controls all of the semiconductor switches in the second switch group SW2 to the on-state. That is, the control apparatus 50 transmits the on-command to the semiconductor switches 31a, 31b, 32a, and 32b. At subsequent step S16, the control apparatus 50 stores failure history that indicates the semiconductor switch in which the on-failure has occurred in the second switch group SW2, in the memory 51 in the control apparatus 50.

At step S17, the control apparatus 50 determines whether the on-failure has occurred in any of the semiconductor switches in the first switch group SW1. Specifically, the control apparatus 50 determines whether the voltage values detected by the voltage detection circuits 61 and 62 are equal to or greater than the predetermined value Vth. When determined NO at step S17, the control apparatus 50 immediately ends the present process. Meanwhile, when determined YES at step S17, the control apparatus 50 determines that the on-failure has occurred in a semiconductor switch in the first switch group SW1 and proceeds to step S18. At step S18, the control apparatus 50 controls all of the semiconductor switches in the first switch group SW1 to the on-state. That is, the control apparatus 50 transmits the on-command to the semiconductor switches 21a, 21b, 22a, and 22b. At subsequent step S19, the control apparatus 50 stores the failure history that indicates the semiconductor switch in which the on-failure has occurred in the first switch group SW1, in the memory 51 in the control apparatus 50.

Here, when determined that the on-failure has occurred in the semiconductor switch, the control apparatus 50 continues the on-control of the switch group that includes the semiconductor switch in which the on-failure has occurred until the ignition switch is subsequently turned off, that is, until the engine stop command to stop the operation of the engine is received. Then, when the engine stop command is received, the control apparatus 50 determines NO at step S11 and proceeds to step S21.

At step S21, the control apparatus 50 determines whether the failure history generated before the ignition switch has been turned off is stored in the memory 51. When determined NO at step S21, the control apparatus 50 immediately ends the present process. When determined YES at step S21, the control apparatus 50 proceeds to step S22. At steps S22 to S24, the control apparatus 50 determines whether a condition for continuing the on-control of the switch group that includes the semiconductor switch in which the on-failure has occurred is met after the ignition switch is turned off. That is, at step S22, the control apparatus 50 determines whether a current period is the power generation period in which the alternator 13 is generating electric power. Specifically, the control apparatus 50 determines whether the generated electric power of the alternator 13 is equal to or greater than a predetermined value. At step S23, the control apparatus 50 determines whether the current period is the discharge period in which discharge of the electrical load 16 is being performed. Specifically, the control apparatus 50 determines whether current consumed by the electrical load 16 is equal to or greater than the dark current. At step S24, the control apparatus 50 determines whether a voltage difference ΔV between the lead storage battery 11 and the lithium-ion storage battery 12 is equal to or greater than a predetermined value Th.

Then, when determined YES at any of steps S22, S23, and S24, the control apparatus 50 proceeds to step S25 and continues the on-control of the semiconductor switches. That is, when the on-failure in the first switch group SW1 has occurred, the on-control of the first switch group SW1 is continued. When the on-failure in the second switch group SW2 has occurred, the on-control of the second switch group SW2 is continued.

Meanwhile, when determined NO at all of steps S22, S23, and S24, the control apparatus 50 proceeds to step S26. At step S26, the control apparatus 50 performs control to set the on-controlled semiconductor switches to the off-state. That is, the control apparatus 50 transmits the off-command to the semiconductor switches.

Here, in a vehicle, replacement of the lead storage battery 11 being performed can be considered. In this case, when the bypass switch 40 is in the closed state and the on-failure in the semiconductor switch in the second switch group SW2 has occurred, a current may unintentionally flow to a diode in the second switch group SW2 immediately after replacement of the lead storage battery 11. That is, the terminal voltage of the lead storage battery 11 is assumed to become greater than the terminal voltage of the lithium-ion storage battery 12 immediately after replacement of the lead storage battery 11. In this state, a current unintentionally flowing to a diode in the second switch group SW2 as a result of the voltage difference between the storage batteries 11 and 12 can be considered. Here, even if the terminal voltage of the lead storage battery 11 is less than the terminal voltage of the lithium-ion storage battery 12 immediately after replacement of the lead storage battery 11, a current unintentionally flowing as a result of the voltage difference can be considered.

Therefore, according to the present embodiment, the switch group SW1 or SW2 that includes the semiconductor switch in which the on-failure has occurred is controlled to the on-state based on the failure history stored before the ignition switch is turned off.

Figure 9:
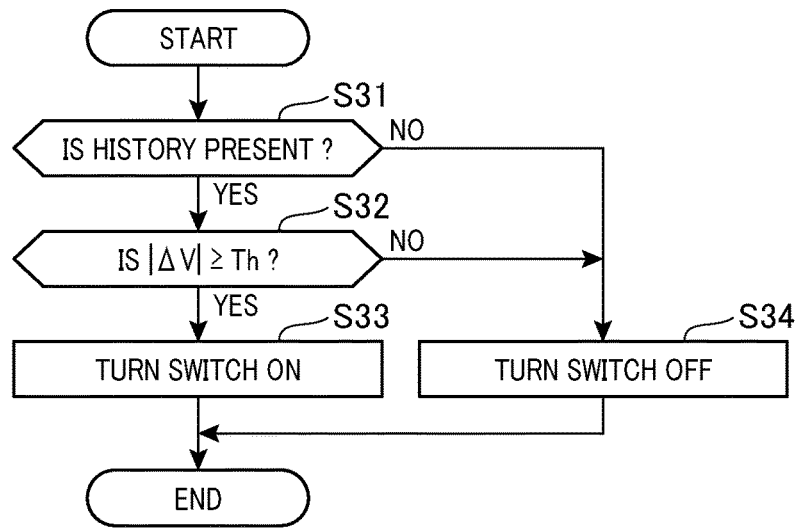
FIG. 9 is a flowchart of a process when the lead storage battery is replaced according to the first embodiment.

FIG. 9 shows a process performed by the control apparatus 50 when the lead storage battery 11 is replaced. The process is performed as a result of a high-order control apparatus (such as the ECU 100) of the control apparatus 50 detecting replacement of the lead storage battery 11 and starting the control apparatus 50 upon detection of the replacement, while the engine is stopped. In this case, replacement of the lead storage battery 11 is detected based on a detection value of the voltage sensor 11a that is provided on the energization path to the lead storage battery 11. Here, the configuration may be such that the control apparatus 50 is provided with a monitoring function for the battery voltage of the lead storage battery 11, and the control apparatus 50 starts by itself when the battery voltage becomes equal to or greater than a predetermined value, from less than the predetermined value. Specifically, the control apparatus 50 starts when a battery voltage applied to the control apparatus 50 is applied again after being temporarily interrupted.

At step S31, the control apparatus 50 determines whether the failure history that has been generated before the ignition switch has been turned off is stored in the memory 51. When determined NO at step S31, the control apparatus 50 immediately ends the present process. When determined YES at step S31, the control apparatus 50 proceeds to step S32. At step S32, the control apparatus 50 determines whether the voltage difference ΔV between the replacement lead storage battery 11 and the lithium-ion storage battery 12 is equal to or greater than the predetermined value Th. When determined YES at step S32, the control apparatus 50 proceeds to step S33. The control apparatus 50 transmits the on-command to the switch group based on the failure history. That is, the control apparatus 50 sets the switch group that includes the semiconductor switch in which the on-failure has occurred to the on-state. Then, when the voltage difference ΔV becomes less than the predetermined value Th as a result of charging and discharging being performed between the lead storage battery 11 and the lithium-ion storage battery 12, the control apparatus 50 determines NO at step S32 and cancels the on-control of the switch group that includes the semiconductor switch in which the on-failure has occurred. That is, the control apparatus 50 transmits the off-command to the switch group.

Figure 10:
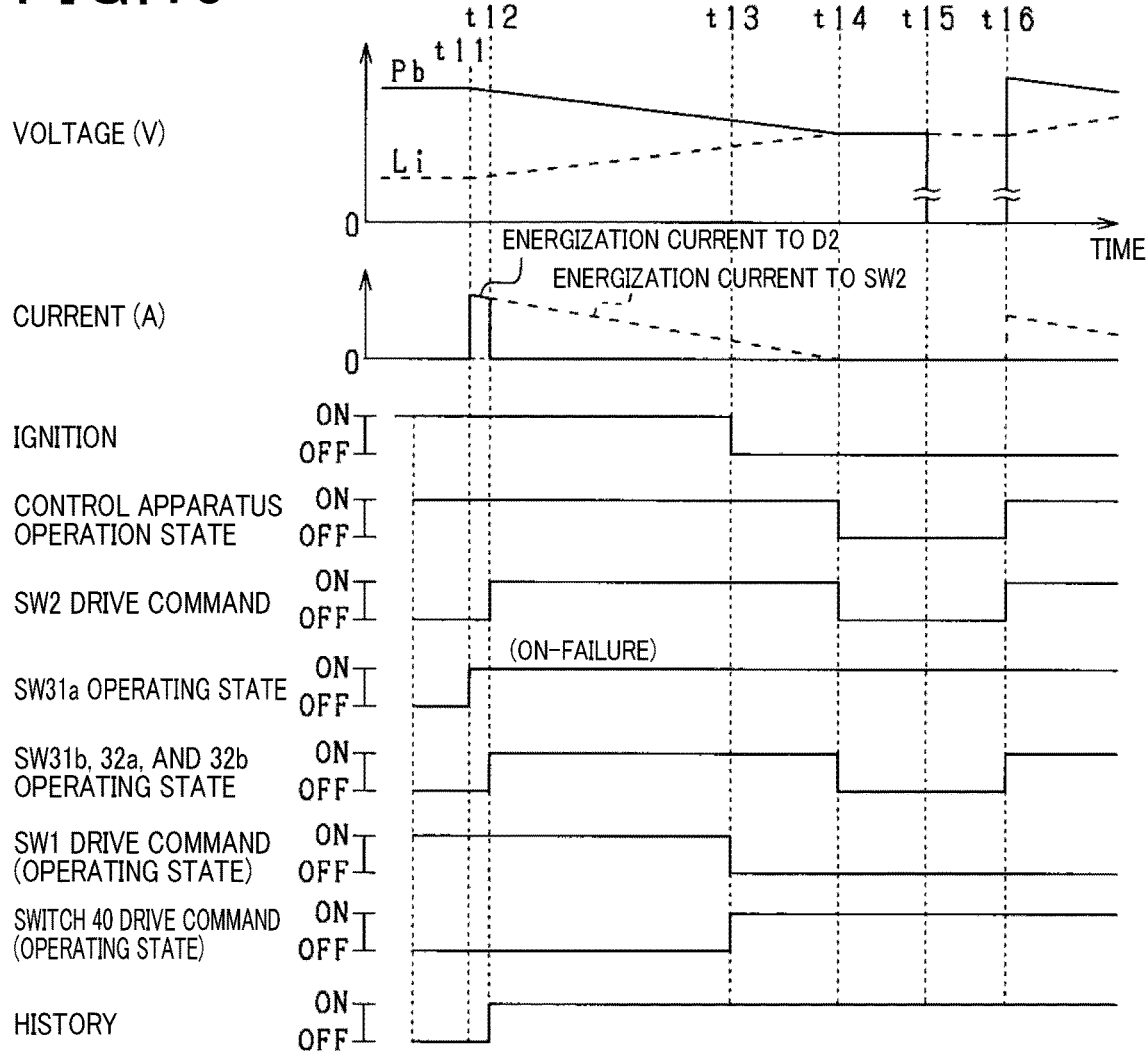
FIG. 10 is a time chart of an aspect of a process according to the first embodiment.

Next, the control shown in FIG. 8 and FIG. 9 will be described with reference to a timing chart in FIG. 10. In FIG. 10, for example, a case in which the on-failure has occurred in the semiconductor switch 31a of the second switch group SW2 is assumed. At the start of the timing chart in FIG. 10, the first switch group SW1 is in the on-state, the second switch group SW2 is in the off-state, and electric power is being supplied from the lead storage battery 11 to the electrical load 16. In addition, the state is such that the terminal voltage of the lead storage battery 11 is greater than the terminal voltage of the lithium-ion storage battery 12.

At timing t11, when the on-failure occurs in the semiconductor switch 31a, the state becomes such that a current may flow from the lead storage battery 11 to the lithium-ion storage battery 12 via the parasitic diode D2 of the semiconductor switch 31b. At this time, as a result of voltage change occurring in accompaniment with the energization of the parasitic diode D2, at timing t12, the on-failure of a semiconductor switch in the second switch group SW2 is determined. Based on this determination result, the on-command is transmitted to the second switch group SW2. As a result of the transmission of the on-command, the semiconductor switches 31b, 32a, and 32b are set to the on-state, and the current flowing to the parasitic diode D2 becomes zero (solid line). In addition, at this time, the failure history of the second switch group SW2 is stored in the memory 51.

Then, as a result of the current flowing from the lead storage battery 11 to the lithium-ion storage battery 12, the voltage difference ΔV between the storage batteries decreases with the passage of time. At this time, the current flowing to the second switch group SW2 decreases (broken line). Then, at timing t13, when the engine stop command is issued, the first switch group SW1 is set to the off-state and the bypass switch 40 is set to the on-state. At this time, the voltage difference ΔV between the lead storage battery 11 and the lithium-ion storage battery 12 is equal to or greater than the predetermined value Th. The on-command to the second switch group SW2 is continued.

Then, at timing t14 when the voltage difference ΔV between the lead storage battery 11 and the lithium-ion storage battery 12 becomes less than the predetermined value Th (such as equal thereto), the on-command to the second switch group SW2 is canceled. That is, the off-command is transmitted to the second switch group SW2. As a result, the second group SW2 excluding the semiconductor switch 31a is set to the off-state and the control apparatus 50 is stopped.

Subsequently, the lead storage battery 11 is removed at timing t15, and a new lead storage battery 11 is attached at timing t16. The control apparatus 50 is then started. At this time, the on-control of the second switch group SW2 is performed based on the voltage difference ΔV between the lead storage battery 11 and the lithium-ion storage battery 12. That is, as a result of the on-command being transmitted to the second switch group SW2, the second switch group SW2 is set to the on-state. Subsequently, the on-control of the second switch group SW2 is performed until the voltage difference ΔV between the lead storage battery 11 and the lithium-ion storage battery 12 becomes less than the predetermined value Th. When the voltage difference ΔV becomes less than the predetermined value Th, the on-control is stopped.

Here, in the above-described timing chart, for convenience, an aspect in which the on-control of the switch group after the ignition is turned off is determined based on the voltage difference ΔV between the lead storage battery 11 and the lithium-ion storage battery 12 is shown. However, the power generation state of the alternator 13 and the discharge state of the electrical load 16 may also be taken into consideration. The on-control of the switch group after the ignition is turned off may be determined based on the power generation state and the discharge state.

According to the present embodiment described in detail above, the following excellent effects are achieved.

In the present power supply system, in each of the opening and closing units 21, 22, 31, and 32 provided on the energization paths L1 and L2, two semiconductor switches are connected in series and connected such that the parasitic diodes that are respectively included in the semiconductor switches are in opposite directions to each other. In this configuration, when the on-failure occurs in one semiconductor switch among the semiconductor switches of the opening and closing units, conduction occurring via the parasitic diode of the other semiconductor switch can be considered. That is, a current unintentionally flowing to the parasitic diode can be considered. Taking this point into consideration, the occurrence of an abnormal state in which a current flows to either of the diodes in the opening and closing unit in a state in which the semiconductor switches of the opening and closing unit are turned off is determined. When the abnormal state is determined to have occurred, the switch that is connected in parallel to the diode through which the current is flowing is controlled to the on-state. As a result, even when the on-failure occurs in any of the plurality of switches in the opening and closing unit, an excessive current flowing to the diode can be suppressed. Adverse issues such as damage can be suppressed.

In addition, the semiconductor switch in which the on-failure has occurred in the opening and closing units can be determined based on the detection results of the voltage detection circuits 61 to 64. In this case, as a result of the on-failure being determined to have occurred in any of the plurality of switches in the opening and closing units, the abnormal state in which a current is flowing to any of the plurality of diodes is determined to have occurred. Therefore, the abnormal state in which a current unintentionally flows to the diode can be appropriately determined.

When the on-failure is determined to have occurred in a semiconductor switch, all semiconductor switches of the opening and closing unit that includes the semiconductor switch in which the on-failure has occurred are set to the on-state. That is, when a current unintentionally flows to a diode, in addition to the semiconductor switch that is connected in parallel to the diode through which the current is flowing, other semiconductor switches in the opening and closing unit, that is, the other semiconductor switches including the semiconductor switch in which the on-failure has occurred are controlled to the on-state. In this case, as a result of the switch in which the on-failure has occurred being controlled to the on-state, on-resistance in the switch is thought to be reduced. Load applied to the switch can be reduced as a result of the reduction in the on-resistance.

When determined that the on-failure has occurred in a semiconductor switch, all semiconductor switches in the switch group that includes the semiconductor in which the on-failure has occurred are set to the on-state. That is, when a current unintentionally flows to a diode in any of the plurality of opening and closing units, the switches are controlled to the on-state in the opening and closing units that are determined to not be in the abnormal state. In this case, even if a current unintentionally flows through a path that includes the opening and closing units, flowing to the opening and closing unit on the side in which the abnormal state has occurred, among the plurality of opening and closing units, can be suppressed. As a result, in the opening and closing unit on the side in which the abnormal state has occurred, the occurrence of a concurrent failure in switches that are in a normal state can be suppressed.

The configuration is such that the abnormal state in which a current is flowing to any of the plurality of diodes is determined to have occurred during the power generation period in which power generation by the alternator 13 is performed or the discharge period in which discharge to the electrical load 16 from the storage batteries 11 and 12 is performed, in a state in which the plurality of switches in the opening and closing unit are turned off. Therefore, a current unintentionally flowing to a diode in the opening and closing unit can be appropriately determined.

In the present power supply system, even after the switches in the opening and closing units are turned off as a result of the engine stop command, power generation by the alternator 13 may be continued or driving of the electrical load may be continued during inertial rotation of the engine. In this case as well, when the on-failure occurs in a switch, a current unintentionally flowing to the diode can be considered. Taking this point into consideration, when the stop command is issued in a state in which the on-failure is determined to have occurred in a semiconductor switch, under a condition that the current period is the power generation period of the alternator 13 and the discharge period of the electrical load 16, the on-control of the switch group that includes the semiconductor switch in which the on-failure has occurred is performed. As a result, even when an abnormality occurs in the power generation state of the power generator or an abnormality occurs in the load driving state immediately after the stop command of the engine, a flow of excessive current to the diode can be appropriately suppressed.

Furthermore, in the present power supply system, when a difference in voltage occurs between the lead storage battery 11 and the lithium-ion storage battery 12 after the stop command of the engine, a current flowing between the storage batteries via the opening and closing unit when the on-failure has occurred in a switch can be considered. Taking this point into consideration, after the stop command is issued in a state in which the on-failure is determined to have occurred in a semiconductor switch, under a condition that the voltage difference $\Delta V$ between the lead storage battery 11 and the lithium-ion storage battery 12 is equal to or greater than Th, the on-control of the switch group that includes the semiconductor switch in which the on-failure has occurred is performed. As a result, a flow of excessive current to the diode can be appropriately suppressed after the stop command of the engine.

In the present power supply system, during discharge from one storage battery of the lead storage battery 11 and the lithium-ion storage battery 12, when the on-failure in a switch in the opening and closing unit on the other storage battery side occurs, a current unintentionally flowing to the diode in the opening and closing unit can be considered. In this regard, as a result of the above-described configuration, during the discharge period in which discharge to the electrical load is performed from only one storage battery of the lead storage battery 11 and the lithium-ion storage battery 12, when the abnormal state has occurred in the opening and closing unit on the other storage battery side, the switches in the opening and closing unit are controlled to the on-state. As a result of this as well, a flow of excessive current to the diode can be appropriately suppressed.

Replacement of the lead storage battery 11 being performed in a state in which the on-failure has occurred in a semiconductor switch of the opening and closing unit can also be considered. For example, an excessive current unintentionally flowing to the diode immediately after the lead storage battery 11 is replaced with a new battery is a concern. Taking this point into consideration, after replacement of the lead storage battery 11, the semiconductor switches are controlled to the on-state based on abnormality history stored in the memory. As a result, a flow of excessive current to the diode can be appropriately suppressed even immediately after replacement of the lead storage battery 11.

Second Embodiment

Next, a second embodiment will be described, mainly focusing on the differences from the first embodiment. Here, according to the present embodiment, the system configuration shown in FIG. 1 is presumed. According to the present embodiment, the control apparatus 50 identifies the semiconductor switch in which the on-failure has occurred and performs control to set the semiconductor switches other than the semiconductor switch in which the on-failure has occurred to the on-state. In other words, because the semiconductor switch in which the on-failure has occurred is already in the on-state, as a result of the semiconductor switches other than this semiconductor switch being set to the on-state, all of the semiconductor switches are thereby set to the on-state.

Figure 11:
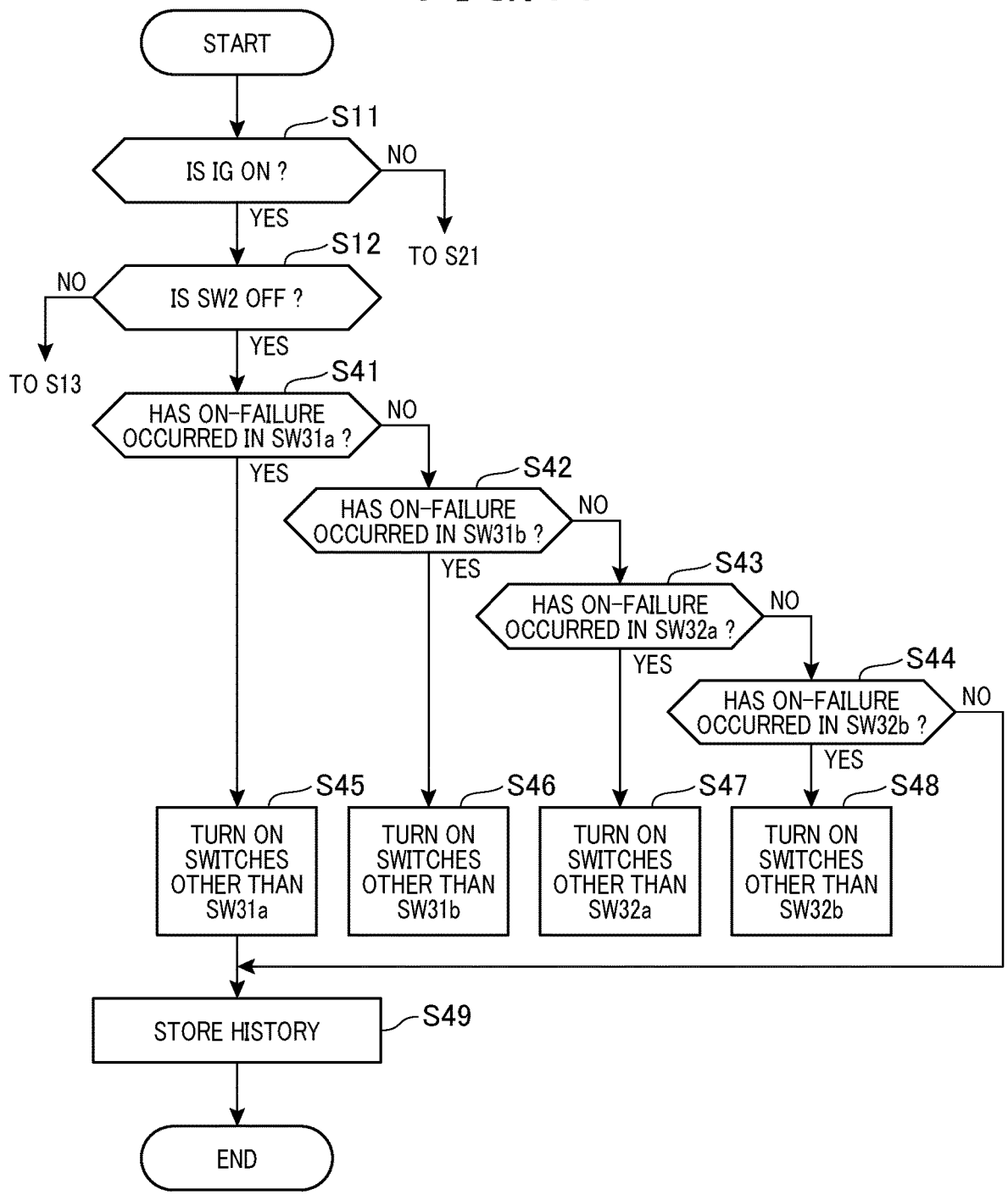
FIG. 11 is a flowchart of a process according to a second embodiment.

A process in this configuration will be described with reference to FIG. 11. FIG. 11 is a process that is performed in place of the process in FIG. 8. In FIG. 11, for convenience, only a part (a part corresponding to steps S11 to S15) of the process in FIG. 8 is extracted and shown. In FIG. 11, processes similar to those in FIG. 8 are given the same step numbers. Descriptions thereof are simplified.

In FIG. 11, when the ignition is on and the off-command is issued for the second switch group SW2 (YES at both steps S11 and S12), the control apparatus 50 proceeds to step S41. Then, at step S41 to step S44, the control apparatus 50 individually determines the semiconductor switch in the second switch group SW2 in which the on-failure has occurred.

Here, for example, regarding a determination that the on-failure has occurred in the semiconductor switch 31$a$, the control apparatus 50 determines that the on-failure has occurred in the semiconductor switch 31$a$ when the voltage detection circuit 63 detects the voltage based on the lead storage battery 11 in a state in which the off-command is issued for the second switch group SW2. Meanwhile, regarding a determination that the on-failure has occurred in the semiconductor switch 31$b$, the control apparatus 50 determines that the on-failure has occurred in the semiconductor switch 31$b$ when the voltage detection circuit 63 detects the voltage based on the lithium-ion storage battery 12 in a state in which the off-command is issued for the second switch group SW2. Here, regarding the on-failures in the semiconductor switches 32$a$ and 32$b$, the determination is similarly performed based on the voltage value detected by the voltage detection circuit 64.

When determined YES at step S41, the control apparatus 50 determines that the on-failure has occurred in the semiconductor switch 31a and proceeds to step S45. The control apparatus 50 transmits the on-command for the semiconductor switches other than the semiconductor switch 31a in the second switch group SW2. That is, in this case, the control apparatus 50 transmits the on-command for the semiconductor switches 31b, 32a, and 32b. Meanwhile, when determined NO at step S41, the control apparatus 50 proceeds to step S42. At step S42, the control apparatus 50 determines whether the on-failure has occurred in the semiconductor switch 31b. When determined YES at step S42, the control apparatus 50 proceeds to step S46. The control apparatus 50 transmits the on-command for the semiconductor switches other than the semiconductor switch 31b in the second switch group SW2, that is, 31a, 32a, and 32b. Hereafter, this similarly applies to steps S43 and 44. Then, when determined that the on-failure has occurred in each semiconductor switch, the control apparatus 50 stores the failure history of each semiconductor switch (step S49).

Here, when determined NO at step S44, the control apparatus 50 determines that the on-failure has not occurred in the second switch group SW2 and immediately ends the present process. In addition, FIG. 11 shows the process for individually determining the on-failure regarding the semiconductor switches in the second switch group SW2. However, the process is similarly performed for the semiconductor switches in the first switch group SW1. Specifically, the process is performed by the steps at steps S17 to S19 in FIG. 8 being replaced with steps at steps S41 to S49 in FIG. 11 corresponding to the first switch group SW1.

As a result of the above-described configuration, the diode through which a current is unintentionally flowing can be identified based on the switch in which the on-failure has occurred. Therefore, the switches to be turned on among the switches in the opening and closing unit can be appropriately ascertained.

Other Embodiments

In the above-described configurations, the configuration is such that the on-failure in a semiconductor switch is determined based on the detection by the voltage detection circuits 61 to 64, under the presumption of the system configuration shown in FIG. 1. However, the configuration may be changed. For example, in FIG. 12A, a current detection circuit 73 is provided between the semiconductor switches 31a and 31b. Specifically, a shunt resistor 73a (current detection resistor) is provided between the semiconductor switches 31a and 31b. Voltages at both ends of the shunt resistor 73a are each inputted to an amplifier circuit 73b. The amplifier circuit 73 amplifies a difference between the voltages at both ends of the shunt resistor 73a and outputs the amplified difference. In this case, a current flowing between the semiconductor switches 31a and 31b is detected by the current detection circuit 73. A current detection signal thereof is inputted to an A/D converting unit 73c and outputted to the control apparatus 50.

Figure 12A:
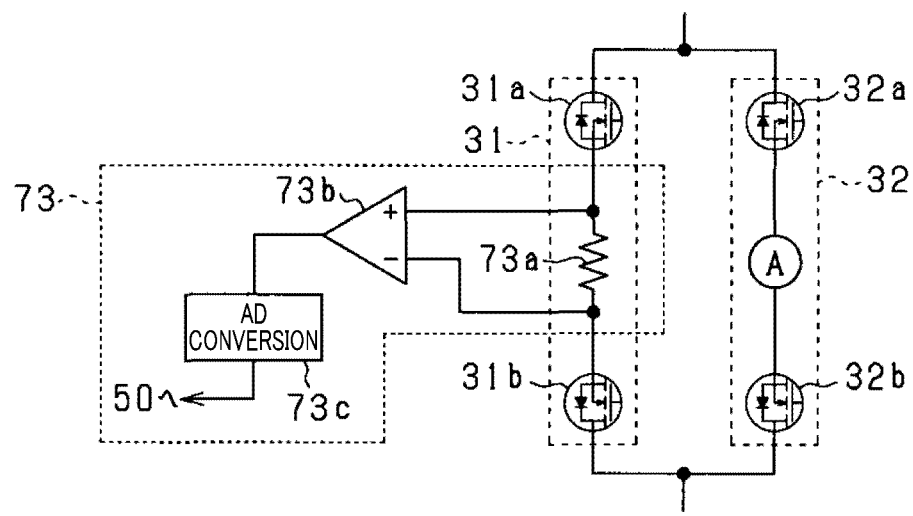
FIGS. 12A-12E illustrate electric circuit diagrams of other configurations of a means for determining an on-failure of a switch.

In the configuration in FIG. 12A as well, the on-failure in a semiconductor switch is determined in a manner similar to that according to the above-described embodiments as a result of the detection result of the current detection circuit 73 being used. That is, when the flow of current is detected by the current detection circuit 73 regardless of the off-command being issued for the semiconductor switches 31a and 31b, the on-failure is determined to have occurred in either of the semiconductor switches 31a and 31b.

Furthermore, whether a failure has occurred in either of the semiconductor switches 31a and 31b is determined based on an orientation of the current detected by the current detection circuit 73. For example, when the current is detected from the lead storage battery 11 side to the lithium-ion storage battery 12 side (from top to bottom in the drawing), the on-failure is determined to have occurred in the semiconductor switch 31a. When the current is detected from the lithium-ion storage battery 12 side to the lead storage battery 11 side (from bottom to top in the drawing), the on-failure is determined to have occurred in the semiconductor switch 31b.

Figure 12B:
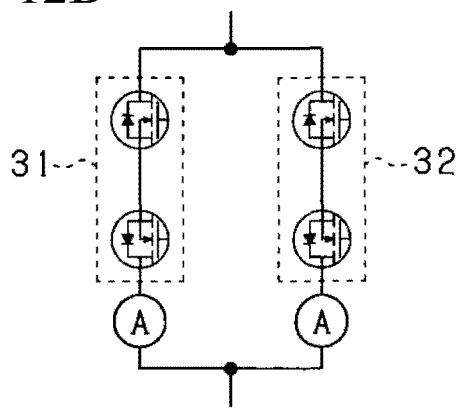
Figure 12C:
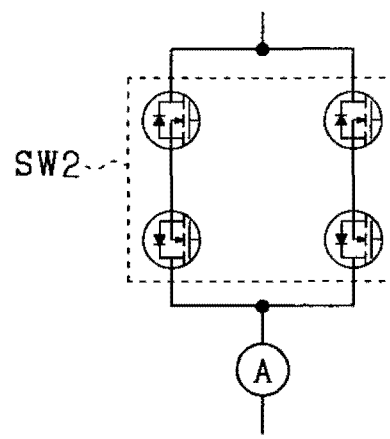

As another configuration in which the current detection circuit is used, for example, as shown in FIG. 12B, the configuration may be such that the current detection circuits are respectively connected in parallel in a side-by-side manner to the opening and closing units 31 and 32 that are composed of two semiconductor switches. In addition, as shown in FIG. 12C, the configuration may be such that the current detection circuit is connected in series in a side-by-side manner to the second switch group SW2 that is composed of two opening and closing units.

Figure 12D:
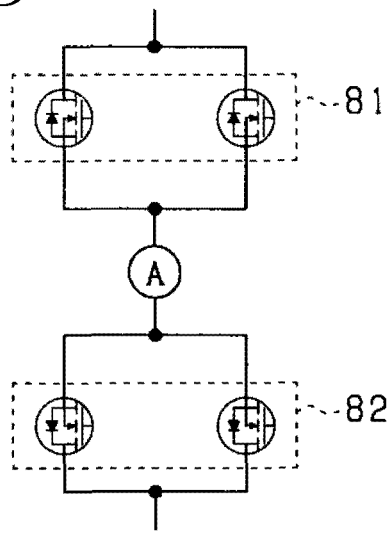

Furthermore, as shown in FIG. 12D, the configuration may be such that, in a switch group in which an opening and closing unit 81 and an opening and closing unit 82 that are composed of two semiconductor switches that are connected in parallel such that the directions of the diodes are the same are connected in series such that the directions of the diodes respectively included in the opening and closing units are opposite directions, the current detection circuit is connected in series between the opening and closing unit 81 and the opening and closing unit 82. In the configuration shown in FIG. 12D, the current detection circuit may be changed to the voltage detection circuit.

According to the above-described embodiments, for example, a configuration in which the two opening and closing units 21 and 22 are connected in parallel is given as the second switch group SW2. However, the configuration is not limited thereto. For example, three or more opening and closing units may be connected in parallel. Alternatively, the configuration may be such that a single opening and closing unit is provided. This similarly applies to the first switch group SW1.

Figure 12E:
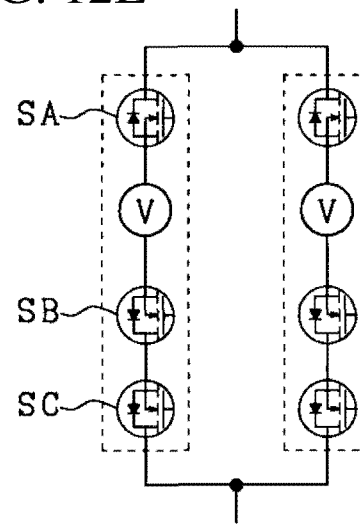

According to the above-described embodiments, for example, that in which the two semiconductor switches 31a and 31b in which the directions of the diodes are opposite each other are connected is used as the opening and closing unit 31. However, the opening and closing unit 31 is not limited thereto. For example, the opening and closing unit 31 may be that in which the opening and closing unit has three or more semiconductor switches, and the semiconductor switches are connected such that the direction of the diode of any of the semiconductor switches is the opposite direction. For example, an opening and closing unit that includes three semiconductor switches SA, SB, and SC such as that shown in FIG. 12E maybe used. In this case, the voltage detection circuit is provided between the switches (in this case, the semiconductor switch SA and the semiconductor switch SB) of which the directions of the diodes are opposite each other. Here, in this configuration, a current does not flow to the diode of the semiconductor switch SA even when the on-failure occurs in either of the semiconductor switches SB and SC. That is, a current flows to the diode of the semiconductor switch SA when the on-failure occurs in both semiconductor switches SB and SC. As a result, the determination of the on-failure in the semiconductor switches SB and SC can be performed.

In the configuration in FIG. 1, the configuration is such that the electrical load 16 that is a constant voltage-requiring load is connected to the output terminal T2 side of the battery unit U, and the electrical load 15 that is a common load is connected to the output terminal T1 side. However, this configuration may be changed. For example, the configuration may be such that the electrical load 15 (common load) is connected to the output terminal T2 side and the electrical load 16 (constant voltage-requiring load) is connected to the output terminal T1 side.

According to the above-described embodiments, the configuration is such that the lead storage battery 11 is provided and the lithium-ion storage battery 12 is provided as the storage batteries. However, the configuration may be changed. For example, instead of the lithium-ion storage battery 12, another high-density storage battery such as a nickel-hydrogen battery may be used. In addition, a capacitor can be used as at least either of the storage batteries.

According to the above-described embodiments, the control apparatus 50 is applied to a power supply system in which the lead storage battery 11, the alternator 13 serving as a power generator, the starter 14, and the electrical load 15 are connected to the output terminal T1, and the electrical load 16 is connected to the output terminal T2. However, the control apparatus 50 may be applied to other power supply systems. For example, the control apparatus 50 may be applied to a power supply system in which the power generator is connected to the output terminal T2 of the above-described power supply system.

The foregoing power supply system will be described with reference to FIG. 13. In FIG. 13, for convenience of description, configurations corresponding to above-described FIG. 1 will be given the same reference numbers. Descriptions thereof are omitted as appropriate.

Figure 13:
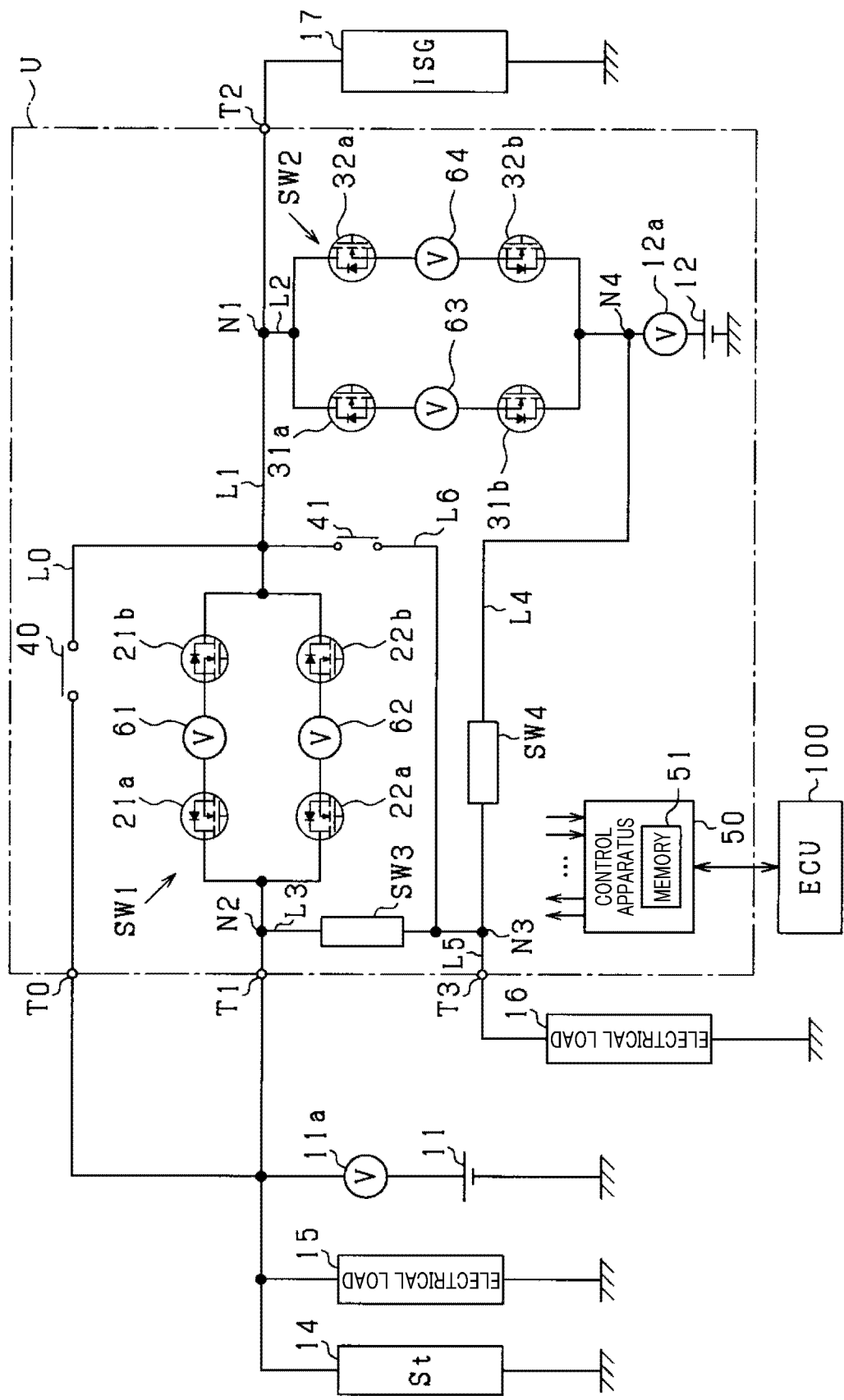
FIG. 13 is an electric circuit diagram of another example of the power supply system.

In the battery unit U shown in FIG. 13, the lead storage battery 11, the starter 14, and the electrical load 15 are connected to the output terminals T1 and TO. An integrated starter generator (ISG) 17 that serves as the power generator is connected to the output terminal T2. The electrical load 16 is connected to an output terminal T3. The ISG 17 functions as a power generator that performs power generation (regenerative power generation) as a result of the rotation of the engine output shaft, and also provides a powering function that applies rotational force to the engine output shaft. Here, when the ISG 17 exerts the powering function (performs power driving), electric power is supplied from the storage batteries 11 and 12. The ISG 17 in this case can be considered to be an electrical load. In addition, in FIG. 13, of the electrical loads 15 and 16, the electrical load 16 includes the constant voltage-requiring load. Another electrical load may be connected to the output terminal T2.

In the battery unit U, the first switch group SW1 is provided on the energization path L1 and the second switch group SW2 is provided on the energization path L2. In addition, one end of a branch path L2 is connected to a connection point N2 between the output terminal T1 and the first switch group SW1 on the energization path L1. Furthermore, one end of a branch path L4 is connected to a connection point N4 between the lithium-ion storage battery 12 and the second switch group SW2 on the energization path L2.

Respective other ends of the branch paths L3 and L4 are connected by an intermediate point N3. In addition, the intermediate point N3 and the output terminal T3 are connected by an energization path L5. Switches SW3 and SW4 are respectively provided on the branch paths L3 and L4. The switches SW3 and SW4 are each configured by a semiconductor switch such as a MOSFET. Power supply from the storage batteries 11 and 12 to the electrical load 16 can be performed over the paths L3 to L5.

In addition, in the battery unit U, bypass paths L0 and L6 that enable connection of the lead storage battery 11 to the electrical load 16 without passing through the switches SW1 to SW4 within the unit are provided. Specifically, the bypass path L0 that connects the output terminal TO and the connection point N1 on the energization path L1 is provided, and the bypass path L6 that connects the connection point N1 and the output terminal T3 is provided in the battery unit U. In addition, the bypass switch 40 is provided on the bypass path L0 and a bypass switch 41 is provided on the bypass path L6. For example, the bypass switches 40 and 41 are each a normally closed relay switch.

As a result of the bypass switch 40 being closed, the lead storage battery 11 and the electrical load 15 are electrically connected even when the first switch group SW1 is turned off (open). In addition, as a result of both bypass switches 40 and 41 being closed, the lead storage battery 11 and the electrical load 16 are electrically connected even when the switches SW1 to SW4 are all turned off (open).

The above-described switches SW1 to SW4, and the bypass switches 40 and 41 are on/off-controlled (opening/closing-controlled) by the control apparatus 50. In this case, for example, on/off of the switches SW1 to SW4 is controlled based on the charging states of the storage batteries 11 and 12. As a result, charging and discharging are performed through selective use of the lead storage battery 11 and the lithium-ion storage battery 12. Here, the bypass switches 40 and 41 are basically held in the open state during operation of the present power supply system and switched to the closed state in an operation stop state.

In the above-described power supply system, during a charging period in which charging of only one storage battery (such as the lead storage battery 11) of the lead storage battery 11 and the lithium-ion storage battery 12 is performed through power generation by the ISG 17, the control apparatus 50 determines that the on-failure has occurred in the opening and closing units (such as the opening and closing units 31 and 32, in this case the second switch group SW2) on the side of the other storage battery (such as the lithium-ion storage battery 12). Then, when determined that the on-failure has occurred in any of the semiconductor switches in the second switch group SW2, the control apparatus 50 controls the semiconductor switches in the second switch group SW2 to the on-state. In this configuration as well, a flow of excessive current to the diode can be appropriately suppressed.

In addition, as other power supply systems, a power supply system that includes only the lead storage battery as the voltage source and supplies electric power from the lead storage battery to the electrical load, and a power supply system that includes the lead storage battery 11 and the power generator as the voltage source, and charges the lead storage battery 11 from the power generator can be given. The control apparatus 50 may be applied to these power supply systems.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

What is claimed is:

1. A power supply control apparatus that is applied to a power supply system that includes an opening and closing unit that has a plurality of switches that are connected in series on an energization path over which energization from a voltage source is performed and a plurality of diodes that are respectively connected in parallel to the plurality of switches, in which the plurality of diodes include diodes that are arranged in opposite directions to each other, the power supply control apparatus comprising:
   a determining unit that determines that an abnormal state has occurred in which a current is flowing to any of the plurality of diodes in a state in which the plurality of switches are turned off; and
   a control unit that controls the switch that is connected in parallel to the diode through which the current is flowing to an on-state, when the abnormal state is determined to have occurred.

2. The power supply control apparatus according to claim 1, wherein:
   the determining unit determines that the abnormal state has occurred by determining that an on-failure has occurred in any of the plurality of switches in the opening and closing unit.

3. The power supply control apparatus according to claim 2, wherein:
   the determining unit determines that, when determined that the on-failure has occurred in any of the plurality of switches in the opening and closing unit, a current is flowing to the diode that is in the direction opposite the diode that is connected in parallel to the switch in which the on-failure has occurred, among the plurality of diodes.

4. The power supply control apparatus according to claim 1, wherein:
   the control unit controls all of the plurality of switches to the on-state when the abnormal state is determined to have occurred.

5. The power supply control apparatus according to claim 1, wherein:
   the power supply control apparatus is applied to a power supply system in which a plurality of opening and closing units are provided in parallel on the energization path;
   the determining unit determines which of the plurality of opening and closing units the abnormal state has occurred in; and
   when the abnormal state is determined to have occurred in any of the plurality of opening and closing units, the control unit controls the plurality of switches in the opening and closing unit in which the abnormal state is not determined to have occurred to the on-state.

6. The power supply control apparatus according to claim 1, wherein: the power supply control apparatus is applied to a power supply system that includes a storage battery that is connected to one end side of the opening and closing unit, and a power generator that is connected to the other end side as the voltage source; and the determining unit determines that the abnormal state has occurred during a power generation period in which power generation by the power generator is being performed in a state in which the plurality of switches are turned off.

7. The power supply control apparatus according to claim 1, wherein:
   the power supply control apparatus is applied to a power supply system that includes a storage battery that is connected to one end side of the opening and closing unit as the voltage source, in which an electrical load is connected to the other end side of the opening and closing unit; and
   the determining unit determines that the abnormal state has occurred during a discharge period in which discharge from the storage battery to the electrical load is being performed in a state in which the plurality of switches are turned off.

8. The power supply control apparatus according to claim 1, wherein:
   the power supply control apparatus is applied to a power supply system that includes a storage battery that is connected to one end side of the opening and closing unit, and a power generator that is connected to the other end side as the voltage source, in which the power generator performs power generation as a result of rotation of an engine, and the plurality of switches in the opening and closing unit are turned off based on a stop command that stops operation of the engine; and
   the control unit controls the switches to the on-state during a period from the stop command until power generation of the power generator is stopped, when the stop command is issued in a state in which the abnormal state is determined to have occurred.

9. The power supply control apparatus according to claim 1, wherein:
   the power supply control apparatus is applied to a power supply system that includes a storage battery that is connected to one end side of the opening and closing unit as the voltage source, in which an electrical load is connected to the other end side of the opening and closing unit, and the plurality of switches in the opening and closing unit are turned off based on a stop command that stops operation of an engine; and
   the control unit controls the switches to the on-state under a condition that a current period is a period until discharge to the electrical load is stopped or a period until supply of dark current to the electrical load is started, when the stop command is issued in a state in which the abnormal state is determined to have occurred.

10. The power supply control apparatus according to claim 1, wherein:
    the power supply control apparatus is applied to a power supply system that includes a first storage battery and a second storage battery that are respectively connected to one end side and the other end side of the opening and closing unit and are connected to each other in parallel as the voltage source, in which the plurality of switches in the opening and closing unit are turned off based on a stop command that stops operation of an engine;
    the control unit controls the switches to the on-state under a condition that a voltage difference between the first storage battery and the second storage battery is equal to or greater than a predetermined voltage difference, after the stop command is issued in a state in which the abnormal state is determined to have occurred.

11. The power supply control apparatus according to claim 1, wherein:
    the power supply control apparatus is applied to a power supply system that includes a first storage battery and a second storage battery that are connected to each other in parallel as the voltage source, and includes a first opening and closing unit and a second opening and closing unit that are provided in series as the opening and closing unit on an energization path between the first storage battery and the second storage battery, in which an electrical load is connected at an intermediate point between the first opening and closing unit and the second opening and closing unit;

the determining unit determines that the abnormal state has occurred in the second opening and closing unit on the second storage battery side during a discharge period in which discharge to the electrical load from only the first storage battery, of the first storage battery and the second storage battery, is being performed; and the control unit controls the switches in the second opening and closing unit to the on-state when the abnormal state is determined to have occurred in the second opening and closing unit.

12. The power supply control apparatus according to claim 1, wherein:

the power supply control apparatus is applied to a power supply system that includes a first storage battery and a second storage battery that are connected to each other in parallel as the voltage source, and includes a first opening and closing unit and a second opening and closing unit that are provided in series as the opening and closing unit on an energization path between the first storage battery and the second storage battery, in which a power generator is connected at an intermediate point between the first opening and closing unit and the second opening and closing unit;

the determining unit determines that the abnormal state has occurred in the second opening and closing unit on the second storage battery side during a charging period in which charging of only the first storage battery, of the first storage battery and the second storage battery, through power generation by the power generator is being performed; and the control unit controls the switches in the second opening and closing unit to the on-state when the abnormal state is determined to have occurred in the second opening and closing unit.

13. The power supply control apparatus according to claim 1, wherein:

the power supply control apparatus is applied to a power supply system that includes a storage battery that is capable of performing discharge over the energization path as the voltage source;

the power supply control apparatus includes a storage unit that, when the abnormal state is determined to have occurred, stores abnormality history thereof in a memory; and when the storage battery is replaced in a state in which the abnormal state is determined to have occurred, after replacement thereof, the control unit controls the switch that is connected in parallel to the diode through which the current is flowing to the on-state, based on the abnormality history that is stored in the memory.

14. A battery unit that is applied to a power supply system that includes a first storage battery and a second storage battery as a voltage source, the battery unit comprising:

a first output terminal to which the first storage battery is connected;

a second output terminal to which at least either of an electrical load that is driven by electric power supply from the voltage source and a power generator is connected;

the second storage battery;

a first opening and closing unit that is provided on a first electrical path that connects the first output terminal and the second output terminal, and opens or closes the first electrical path;

a second opening and closing unit that is provided on a second electrical path that connects a connection point on a side further towards the second output terminal than the first opening and closing unit on the first electrical path and the second storage battery, and opens or closes the second electrical path; and a control apparatus that controls opening and closing of the first opening and closing unit and the second opening and closing unit, wherein the first opening and closing unit and the second opening and closing unit have a plurality of switches that are connected in series and a plurality of diodes that are respectively connected in parallel to the plurality of switches, in which the plurality of diodes include diodes that are arranged in opposite directions to each other, and the control apparatus includes a determining unit that determines that an abnormal state has occurred in which a current is flowing to any of the plurality of diodes in a state in which the plurality of switches are turned off, and a control unit that controls the switch that is connected in parallel to the diode through which the current is flowing to an on-state, when the abnormal state is determined to have occurred.

* * * * *